US009864655B2

(12) United States Patent
Patnaik et al.

(10) Patent No.: US 9,864,655 B2
(45) Date of Patent: Jan. 9, 2018

(54) METHODS AND APPARATUS FOR MOBILE COMPUTING DEVICE SECURITY IN TESTING FACILITIES

(71) Applicant: Google Inc., Mountain View, CA (US)

(72) Inventors: Pratyus Patnaik, Los Altos, CA (US); Jordan Carlson, San Carlos, CA (US); Jong Hyeop Kim, San Francisco, CA (US); Frank Farzan, Mountain View, CA (US); Andy Chang, San Jose, CA (US); Emma E. Marsh, Oakland, CA (US)

(73) Assignee: Google LLC, Mountain View, CA (US)

( * ) Notice: Subject to any disclaimer, the term of this patent is extended or adjusted under 35 U.S.C. 154(b) by 129 days.

(21) Appl. No.: 14/928,961

(22) Filed: Oct. 30, 2015

(65) Prior Publication Data
US 2017/0123925 A1 May 4, 2017

(51) Int. Cl.
G06F 11/00 (2006.01)
G06F 11/14 (2006.01)

(52) U.S. Cl.
CPC ...... *G06F 11/143* (2013.01); *G06F 2201/865* (2013.01)

(58) Field of Classification Search
CPC .................... G06F 11/143; G06F 2201/865
See application file for complete search history.

(56) References Cited

U.S. PATENT DOCUMENTS

| 4,953,084 | A | 8/1990 | Meloy et al. |
| 6,131,188 | A | 10/2000 | Goebel |
| 6,145,122 | A | 11/2000 | Miller et al. |
| 6,151,701 | A | 11/2000 | Humphreys et al. |
| 6,598,221 | B1 | 7/2003 | Pegatoquet et al. |
| 6,829,733 | B2 | 12/2004 | Richardson et al. |
| 7,051,238 | B2 | 5/2006 | Gardner et al. |

(Continued)

OTHER PUBLICATIONS

International Search Report and Written Opinion of the International Searching Authority for PCT/US2016/053574 dated Jan. 16, 2017.

(Continued)

*Primary Examiner* — Matt Kim
*Assistant Examiner* — Katherine Lin
(74) *Attorney, Agent, or Firm* — McDonnell Boehnen Hulbert & Berghoff LLP

(57) ABSTRACT

Methods and apparatus are provided for providing testing as a service. A loading computing device can receive a request to restore a testing computing device to a known software configuration. The loading computing device, after receiving the request to restore the testing computing device, can restore the testing computing device by at least: obtaining a software image storing the known software configuration, where the software image includes security-context data having security contexts associated with the plurality of software components, and where a particular security context can have an identity, a role, and a domain or type; storing at least part of the obtained software image onto the testing computing device, and after storing at least part of the obtained software image onto the testing computing device, setting security contexts for the obtained software image stored on the testing computing device using the security-context data.

20 Claims, 11 Drawing Sheets

(56) References Cited

U.S. PATENT DOCUMENTS

| | | |
|---|---|---|
| 7,418,697 B2 | 8/2008 | Gryko et al. |
| 7,676,503 B2 | 3/2010 | Van Ingen et al. |
| 7,805,707 B2 | 9/2010 | Pouliot |
| 7,870,540 B2 | 1/2011 | Zare et al. |
| 7,991,747 B1 | 8/2011 | Upadhyay et al. |
| 8,291,261 B2 | 10/2012 | Malleck et al. |
| 8,307,456 B2 | 11/2012 | Walsh et al. |
| 8,370,810 B2 | 2/2013 | Oda |
| 8,479,166 B2 | 7/2013 | Nir-Buchbinder et al. |
| 8,504,987 B2 | 8/2013 | Li et al. |
| 8,626,124 B2 | 1/2014 | Mallick |
| 8,671,080 B1 | 3/2014 | Upadhyay et al. |
| 8,874,520 B2 | 10/2014 | Zhang et al. |
| 9,015,129 B2 | 4/2015 | Timashev et al. |
| 9,021,443 B1 | 4/2015 | Lachwani et al. |
| 2002/0010710 A1 | 1/2002 | Binnig |
| 2002/0040470 A1 | 4/2002 | Guthrie et al. |
| 2002/0166081 A1 | 11/2002 | Richardson et al. |
| 2003/0221184 A1 | 11/2003 | Gunjal et al. |
| 2004/0194072 A1 | 9/2004 | Venter |
| 2005/0273776 A1 | 12/2005 | Guilford |
| 2005/0278707 A1 | 12/2005 | Guilford |
| 2006/0059253 A1 | 3/2006 | Goodman et al. |
| 2006/0123233 A1 | 6/2006 | Aaron |
| 2006/0242709 A1 | 10/2006 | Seinfeld et al. |
| 2007/0288644 A1 | 12/2007 | Rojas et al. |
| 2008/0055640 A1* | 3/2008 | Takahashi .............. G06F 9/4411 358/1.15 |
| 2009/0150420 A1 | 6/2009 | Towner |
| 2009/0307763 A1* | 12/2009 | Rawlins .............. G06F 9/44505 726/5 |
| 2011/0047597 A1 | 2/2011 | Mahaffey et al. |
| 2011/0289483 A1 | 11/2011 | Williams et al. |
| 2012/0198279 A1 | 8/2012 | Schroeder |
| 2012/0253745 A1 | 10/2012 | Dhanapal et al. |
| 2012/0260344 A1 | 10/2012 | Maor et al. |
| 2013/0060890 A1 | 3/2013 | Lee et al. |
| 2013/0152047 A1 | 6/2013 | Moorthi et al. |
| 2013/0179858 A1 | 7/2013 | Mecke et al. |
| 2013/0185798 A1 | 7/2013 | Saunders et al. |
| 2013/0227636 A1 | 8/2013 | Bettini et al. |
| 2013/0276061 A1 | 10/2013 | Chebiyyam et al. |
| 2013/0282892 A1 | 10/2013 | Levi et al. |
| 2013/0283377 A1 | 10/2013 | Das et al. |
| 2014/0020096 A1 | 1/2014 | Khan et al. |
| 2014/0082729 A1 | 3/2014 | Shim et al. |
| 2014/0237455 A1 | 8/2014 | Koneru et al. |
| 2014/0298462 A1* | 10/2014 | Stuntebeck .............. G06F 21/56 726/23 |
| 2017/0076105 A1* | 3/2017 | Paulovicks ......... G06F 21/6218 |

OTHER PUBLICATIONS

Android Open Source Project, "ADB Shell Commands", Sep. 6, 2015, available via the Internet at developer.android.com/tools/help/shell.html (last visited Sep. 30, 2015).

Android Open Source Project, "Android Debug Bridge", Aug. 24, 2015, available via the Internet at developer.android.com/tools/help/adb.html (last visited Sep. 27, 2015).

Android Open Source Project, "Security-Enhanced Linux in Android", Jul. 8, 2015, available via the Internet at source.android.com/devices/tech/security/selinux/ (last visited Oct. 1, 2015).

Bakos et al., "Lightweight Error Correction Coding for System-Level Interconnects", Mar. 2007, IEEE Transactions on Computers, vol. 56, No. 3, Mar. 2007, pp. 289-304, available via the Internet at people.cs.pitt.edu/~kirk/cs2001/don.pdf (last visited Jul. 2, 2004).

Chowdhury, "Non Final Office Action dated Feb. 13, 2014", U.S. Appl. No. 13/631,919, The United States Patent and Trademark Office, dated Feb. 13, 2014.

Chowdhury, "Notice of Allowance dated Jul. 2, 2014", U.S. Appl. No. 13/631,919, The United States Patent and Trademark Office, dated Jul. 2, 2014.

Coyer, "Non Final Office Action dated Jun. 5, 2014", U.S. Appl. No. 13/721,632, The United States Patent and Trademark Office, dated Jun. 5, 2014.

Dearle, "Software Deployment, Past, Present and Future", May 20, 2007, Proceedings of Future of Software Engineering 2007, pp. 269-284, available via the Internet at www.cs.tufts.edu/comp/250SA/papers/dearle2007.pdf (last visited Jul. 2, 2014).

A. Desnos et al., "androguard", Dec. 23, 2013, available via the Internet at code.google.com/p/androguard/ (last visited Sep. 3, 2015).

G. Di Guglielmo et al, "Model-Driven Design and Validation of Embedded Software", May 23, 2011, Proceedings of the 6th International Workshop on Automation of Software Test, pp. 98-104, available via the Internet at dbonline.igroupnet.com/ACM.TOOLS/Rawdata/Acm 11 06/fulltext/1990000/1982616/p98-guglielmo.pdf (last visited Jul. 2, 2014).

R. Hertzog et al., "Introduction to SE Linux", Jun. 3, 2012, available via the Internet at debian-handbook.info/browse/stable/sect.selinux.html (last visited Oct. 1, 2015).

C. Hoffmann, "How to Install and Use ADB, the Android Debug Bridge Utility" Oct. 3, 2012, available via the Internet at www.howtogeek.com/125769/how-to-install-and-use-abd-the-android-debug-bridge-utility/ (last visited Sep. 3, 2015).

Iphonedevwiki, "debugserver", Apr. 16, 2014, available via the Internet at iphonedevwiki.net/index.php/Debugserver (last visited Apr. 22, 2014).

lldb.llvm.org, "The LLDB Debugger", Nov. 14, 2012, available via the Internet at lldb.llvm.org (last visited Apr. 22, 2014).

H. Lockheimer, "Android and Security", Feb. 2, 2012, Google Mobile Blog, available via the Internet at googlemobile.blogspot.com/2012/02/android-and-security.html (last visited Oct. 30, 2015).

C. Lu, "Debug Java applications remotely with Eclipse", developerWorks, IBM, Dec. 9, 2008, available from the Internet via www.ibm.com/developerworks/library/os-eclipse-javadebug (last visited Apr. 22, 2014).

T. Muller et al., "Efficient Higher-Order CRFs for Morphological Tagging", Oct. 18, 2013, Proceedings of the 2013 Conference on Empirical Methods in Natural Language Processing, pp. 322-332, ACM Press.

J. Paul, "How to setup Java remote debugging in Eclipse", Feb. 25, 2011,Javarevisited-Biog about Java programming language,FIX Protocol, Tibco Rendezvous and related Java technology stack, available via the Internet at javarevisited.blogspot.com/2011/02/how-to-setup-remote-debugging-in.html (last visited Apr. 22, 2014).

Pyzocha, "Non Final Office Action dated May 13, 2014", U.S. Appl. No. 13/655,667, The United States Patent and Trademark Office, dated Sep. 9, 2014.

Pyzocha, "Non Final Office Action dated Sep. 9, 2014", U.S. Appl. No. 13/655,667, The United States Patent and Trademark Office, dated Sep. 9, 2014.

R. Radeanu et al., "Explanation of the chcon command", Jul. 5, 2013, available via the Internet at askubuntu.com/questions/316745/explanation-of-the-chcon-command (last visited Sep. 4, 2015).

M. Rueher et al., "Capturing Software Processes Through the Generated Objects", 1988, pp. 148-152 [online], available via the Internet at delivery.acm.org/10.1145/80000/75138/p148-rueher.pdf (last visited Jul. 2, 2014).

S. H. Seo et al., "Analysis on maliciousness for mobile applications", 2012 Sixth International Conference on Innovative Mobile and Internet Services in Ubiquitous Computing, IEEE, Jul. 4, 2012, pp. 126-129.

S. Smalley, "Security Enhancements (SE) for Android", Apr. 29, 2014, available via the Internet at events. linuxfoundation.org/sites/events/files/slides/abs2014_seforandroid_smalley.pdf (last visited Oct. 31, 2015).

Wikimedia Foundation, "Google Play", Sep. 3, 2015, available via the Internet at en.wikipedia.org/w/index.php?title=Google_Play&oldid=679247545 (last visited Sep. 3, 2015).

(56) References Cited

OTHER PUBLICATIONS

Wikimedia Foundation, "Security Enhanced Linux", Aug. 31, 2015, available via the Internet at en wikipedia.org'w/index. php?title=Security-Enhanced_Linux&oldid=678770902 (last visited Sep. 10, 2015).

* cited by examiner

282 Enable debugging access to device D

284 Add debugging software to device D

286 Make device settings on device D to operate in testing facility

288 Use computing device 200 / method 202 to save a list L of partitions of device D in a known software configuration to location L1

METHODS AND APPARATUS FOR MOBILE COMPUTING DEVICE SECURITY IN TESTING FACILITIES

BACKGROUND

Unless otherwise indicated herein, the materials described in this section are not prior art to the claims in this application and are not admitted to be prior art by inclusion in this section.

Recently, many software applications have been developed for use on mobile computing devices. To increase the likelihood of a positive user experience with these software applications, a software application can be tested during one or more testing sessions. These testing sessions can include analysis of test results for tests involving application execution on various devices and under various operating conditions. The test results and subsequent analysis can be used to find and address software bugs or other issues associated with the application and/or to improve the application performance.

SUMMARY

In one aspect, a method is provided. A loading computing device receives a request to restore a testing computing device to a known software configuration. The known software configuration includes a plurality of software components for the testing computing device. The loading computing device, after receiving the request to restore the testing computing device to the known software configuration, restores the testing computing device. To restore the loading testing device, the loading computing device at least: obtains a software image storing at least part of the known software configuration from computer-readable storage, where the software image includes security-context data having one or more security contexts associated with the plurality of software components, and where a particular security context of the one or more security contexts includes an identity, a role, and a domain; stores at least the plurality of software components of the obtained software image onto the testing computing device, and after storing the plurality of software components onto the testing computing device, setting one or more security contexts for the plurality of software components stored on the testing computing device using the security-context data stored with the software image.

In another aspect, a computing device is provided. The computing device includes one or more processors and data storage. The data storage is configured to store at least a software image and executable instructions. The executable instructions, when executed by the one or more processors, cause the computing device to perform functions. The functions include: receiving a request to restore a testing computing device to a known software configuration including a plurality of software components for the testing computing device; and after receiving the request to restore the testing computing device to the known software configuration, restoring the testing computing device to the known software configuration by at least: obtaining the software image from the computer-readable storage, the software image storing at least part of the known software configuration, where the software image includes security-context data having one or more security contexts associated with the plurality of software components, and where a particular security context of the one or more security contexts includes an identity, a role, and a domain; storing at least the plurality of software components of the obtained software image onto the testing computing device; and after storing the plurality of software components onto the testing computing device, setting one or more security contexts for the plurality of software components stored on the testing computing device using the security-context data stored with the software image.

In another aspect, an article of manufacture is provided. The article of manufacture includes a tangible computer-readable medium having instructions stored thereon. The instructions, in response to execution by one or more processors of a computing device, cause the computing device to perform functions. The functions include: receiving a request to restore a testing computing device to a known software configuration that includes a plurality of software components for the testing computing device; and after receiving the request to restore the testing computing device to the known software configuration, restoring the testing computing device to the known software configuration by at least: obtaining a software image from the computer-readable storage, the software image storing at least part of the known software configuration, where the software image includes security-context data having one or more security contexts associated with the plurality of software components, and where a particular security context of the one or more security contexts includes an identity, a role, and a domain; storing at least the plurality of software components of the obtained software image onto the testing computing device; and after storing the plurality of software components onto the testing computing device, setting one or more security contexts for the plurality of software components stored on the testing computing device using the security-context data stored with the software image.

In another aspect, a device is provided. The device includes: means for receiving a request to restore a testing computing device to a known software configuration that includes a plurality of software components for the testing computing device; and means for, after determining to restore the testing computing device to the known software configuration, restoring the testing computing device to the known software configuration. The means for, after determining to restore the testing computing device to the known software configuration, restoring the testing computing device to the known software configuration include: means for obtaining the software image from the computer-readable storage, the software image storing at least part of the known software configuration, where the software image includes security-context data having one or more security contexts associated with the plurality of software components, and where a particular security context of the one or more security contexts includes an identity, a role, and a domain; means for storing at least the plurality of software components of the obtained software image onto the testing computing device; and means for, and after storing the plurality of software components onto the testing computing device, setting one or more security contexts for the plurality of software components stored on the testing computing device using the security-context data stored with the software image.

BRIEF DESCRIPTION OF THE DRAWINGS

FIG. 2B is a flow chart of a method, in accordance with an example embodiment.

DETAILED DESCRIPTION

Figure 1:
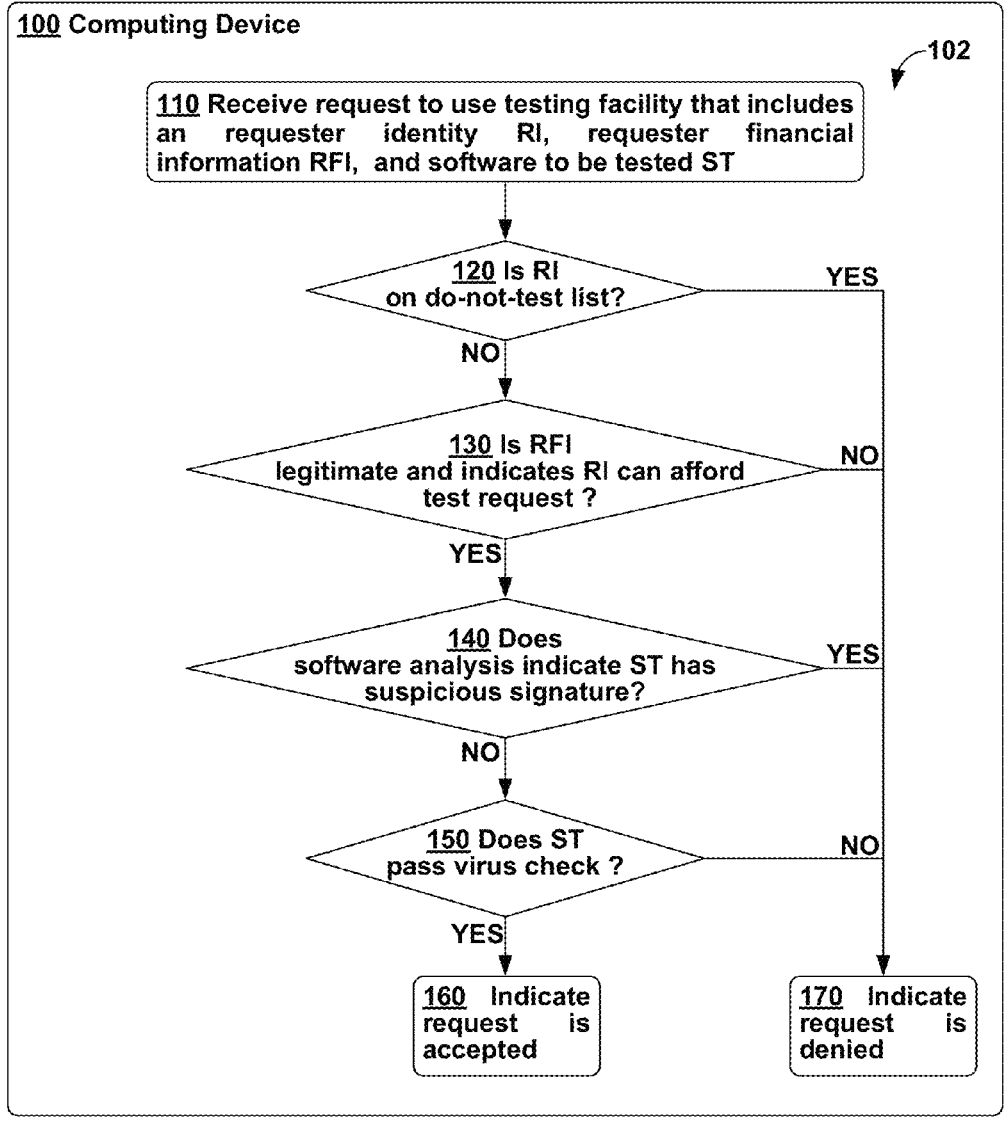
FIG. 1 is a block diagram of a computing device, in accordance with an example embodiment.

A software engineering approach known as mobile testing as a service can enable better testing of software of computing devices, including mobile computing devices. Mobile testing as a service can use networked or "cloud" resources for testing of software applications for mobile computing devices. For example, a user can upload a software application package to a mobile testing cloud service in order to test functionality and/or performance of the software application package. The uploaded software can be deployed and tested on one or more mobile computing devices residing in a testing facility supporting mobile testing as a service.

Mobile computing devices can be shared at the testing facility to enable economically providing a wide variety of mobile computing devices for application testing. During a testing session, only one tester (or testing entity) can access a particular mobile computing device. The particular mobile computing device can be configured to operate using a plurality of versions of an operating system, such as a mobile operating system. The mobile operating system can support basic functions of the mobile computing device, where the basic functions can include but are not limited to, scheduling software (applications) for execution, executing software using one or more processors and data storage of the mobile computing device, allocation of resources (e.g., memory, input/output devices, sensors) of the mobile computing device, and controlling input/output devices, sensors, and/or other components of the mobile computing device. In some examples, other operating systems can provide these basic functions as well, such as a tablet operating system that can be used for tablet computing devices, a desktop operating system that can be used for desktop computing devices, and other operating systems that can be used for mobile and/or immobile computing devices.

Some of the versions of the operating system can have known vulnerabilities. These vulnerabilities may be addressed in later versions of the operating system. However, a test session on a specific version of the operating system may encounter the known vulnerabilities of the specific operating system version. A user could exploit vulnerabilities to achieve root access and/or obtain a root account on a device used to provide mobile testing as a service. Such a user can leave harmful software, such as malware and Trojan horses, that may not be removed and so could be executed during a later testing session. A user with root access can change data, files, and/or partitions, such as system, radio, and boot partitions, used by an operating system for the device. For example, the user can infect and/or replace various critical system commands with problematic software; such as, one or more computer viruses and/or other software that imitates or "spoofs" the replaced system commands but, when executed, launches an attack on the device and/or other devices.

Herein-described procedures can provide better security for testing facilities providing mobile testing as a service and/or testing as a service for mobile and/or immobile computing devices, including testing involving problematic software. The procedures can include preemptive techniques to decline suspicious tests, precautionary techniques to contain information loss, and reactive techniques to purge shared mobile computing devices of software used/testing during a test session.

These procedures and techniques enable the secure reuse of devices in testing facilities providing testing as a service, even where the device may be vulnerable to problematic software introduced during testing sessions. As devices are restored to a known, safe software configuration, each testing entity can be protected from the problematic software and can execute tests specifically designed for the known software configuration. In some embodiments, these procedures and techniques can be used on any device type manufactured by any manufacturer, enabling the testing facility to use the same techniques on all devices used in providing testing as a service. Additionally, the procedures and techniques can be used on both mobile and immobile computing devices.

Preemptive and Precautionary Techniques for Securing Testing Facilities

Preemptive techniques for declining suspicious tests can include checking a reputation of a requesting entity to use the testing facility based on history of the requesting entity with the software service. For example, if history indicates that the requesting entity has tried to use problematic software and/or obtain root access for device(s) in the testing facility, then the request to use the testing facility can be declined. As another example, if history indicates the requesting entity has a reputation for using reasonable testing procedures while employing the testing facility, then the request can be accepted, or at least considered further.

Another preemptive technique can include checking the requesting entity's credit history and/or other financial records. For example, if requesting entity attempts to pay for a mobile testing service using a fraudulent, stolen, or overdrawn credit card, the request to use the testing facility can be declined. As another example, if a credit check and/or other financially-based tests indicate the requesting entity has sufficient funds and/or is a good credit risk for paying for the mobile testing service, then the request can be accepted, or at least considered further.

Another preemptive technique can include checking software to be tested, including any test bundles used in connection with the software to be tested. If the software to be tested does not check out (that is, the software is or appears to be suspicious), then the request to use the testing facility can be declined. Otherwise, if the software to be tested checks out, then the request can be accepted, or at least considered further.

The precautionary techniques to contain information loss can include disabling communications with a device used during a testing session soon or immediately after the testing session is completed. The communications can be disabled using hardware and/or software techniques; e.g., moving a physical button or switch to disable device communications, actuating, touching, and/or otherwise selecting an "airplane mode" or similar button provided by a graphical user interface to at least temporarily disable device communications, sending or otherwise providing a remote command (or commands) to the device that will disable device communications upon execution. The disabled communications can include wireless and/or wired communications. Another technique for disabling communications is to remove or not utilize subscriber identity modules (SiMs) and/or credentials to access telephone and/or other networks. Also, certain devices, such as cameras and microphones, can be disabled to avoid storing and/or communicating imagery and sound, respectively. For example, cameras and/or microphones can be taped of to be (temporarily) disabled.

FIG. 1 is a block diagram of a computing device 100, in accordance with an example embodiment. Computing device 100 can include some or all of the aspects of computing device 800 discussed below in the context of FIG. 8A, including but not limited to one or more processors 803 and data storage such as data storage 804. The data storage of computing device 100 can store computer readable instructions, such as computer readable instructions 806 of computing device 800 discussed below in the context of FIG. 8A. As illustrated in FIG. 1, computing device 100 can be configured to carry out at least the features of method 102. For example, data storage of computing device 100 can store computer executable instructions that, when executed by one or more processors of computing device 100, can cause computing device 100 to perform at least the features of method 102.

Method 102 can begin at block 110, where computing device 100 can receive a request to use a test facility. The request can include a requester identity RI, request financial information RFI, and/or software to be tested ST.

At block 120, computing device 100 can determine whether requester identity RI is on a "do-not-test" list. The do-not-test list can list persons and/or entities that have previously unsuccessfully and/or successfully sent and/or tested suspicious applications at the testing facility. Other persons and/or entities can be added to the do-not-test list as well. If requester identity RI is on the do-not-test list, then computing device 100 can proceed to block 170. Otherwise, requester identity RI is not on the do-not-test list and computing device 100 can proceed to block 130.

At block 130, computing device 100 can determine whether request financial information RFI is legitimate and shows that requester identity RI can afford to pay for the request to use the testing facility. For example, computing device 100 can examine information from a credit check and/or one or more inquiries of financial institutions about requester identity RI and/or request financial information RFI to determine if request financial information RFI is legitimate. For example, if request financial information RFI refers to a fraudulent, stolen, or overdrawn credit card, the request to use the testing facility can be declined. As another example, if a credit check and/or other financially-based tests of requesting identity RI and request financial information RFI indicate the requesting identity RI has sufficient funds and/or is a good credit risk for paying for the mobile testing service, then the request can be accepted, or at least considered further.

If additional information is required to determine whether requesting identity RI has sufficient funds and/or is a good credit risk for paying for the mobile testing service, computing device 100 can obtain that additional information. For example, if RFI is a credit card or other credit instrument associated with a financial institution and/or card issuer, computing device 100 can inquire with the financial institution and/or card issuer to determine issuer whether or not the credit card or other credit instrument is legitimate and/or whether the credit card or other credit instrument has a suitable balance to pay for the request to use the testing facility. In other examples, computing device 100 can attempt to use the request financial information RFI to pay for the request to use the testing facility—if the attempt succeeds, then requester identity RI can afford to pay for the request to use the testing facility; otherwise, requester identity RI either cannot afford to pay for the request to use the testing facility or has not provided suitable financial information to ensure that the request to use the testing facility can be paid for.

If computing device 100 determines that request financial information RFI is legitimate and that request financial information RFI shows that requester identity RI can afford to pay for the request to use the testing facility, then computing device 100 can proceed to block 140. Otherwise, computing device 100 can proceed to block 170.

At block 140, computing device 100 can determine whether software to be tested ST is or appears to be suspicious. For example, software to be tested ST can be examined using one or more software checking tools. As one example, one or more software checking tools can perform a static analysis of the software to be tested; e.g., static analysis tools such as, but not limited to, androguard, MarMoT, and Bouncer. If the static analysis indicates the software to be tested has a suspicious signature, then software to be tested ST can be considered to be suspicious, or at least, appear to be suspicious. If computing device 100 can whether software to be tested ST is or appears to be suspicious, then computing device 100 can proceed to block 170. Otherwise, software to be tested ST at least does not appear to be suspicious, and computing device 100 can proceed to block 150.

At block 150, computing device 100 can determine whether software to be tested ST passes one or more virus checks. For example, software to be tested ST can be subject to one or more virus checks. Optionally, another software checking tool, or tools, can be used as well to check the software to be tested at block 140 and/or block 150. If the one or more virus checks indicate problematic software is present in software to be tested ST and/or indicate software to be tested ST is otherwise problematic, then computing device 100 can determine that software to be tested ST does not pass the one or more virus checks, and proceed to block 170. Otherwise, computing device 100 can determine that software to be tested ST does pass the one or more virus checks, and proceed to block 160.

At block 160, computing device 100 can indicate that the request received at block 110 has been accepted. In some embodiments, the software to be tested ST can be stored in a particular location or locations for loading onto one or more devices in the testing facility prior to the now-approved testing session, either at that time or later in the process. In other embodiments, after completing the procedures of block 160, method 102 can be completed. In still other embodiments, after completing the procedures block 160, computing device can restart method 102; e.g., by proceeding from block 160 to block 110 and await another request to use the testing facility.

At block 170, computing device 100 can indicate that the request received at block 110 has been denied. In some embodiments, after completing the procedures of block 170, method 102 can be completed. In other embodiments, after completing the procedures of block 170, computing device 100 can restart method 102; e.g., by proceeding from block 170 to block 110 and awaiting another request to use the testing facility.

Techniques for Saving Snapshots of Devices Used in Testing Sessions

Figure 2A:
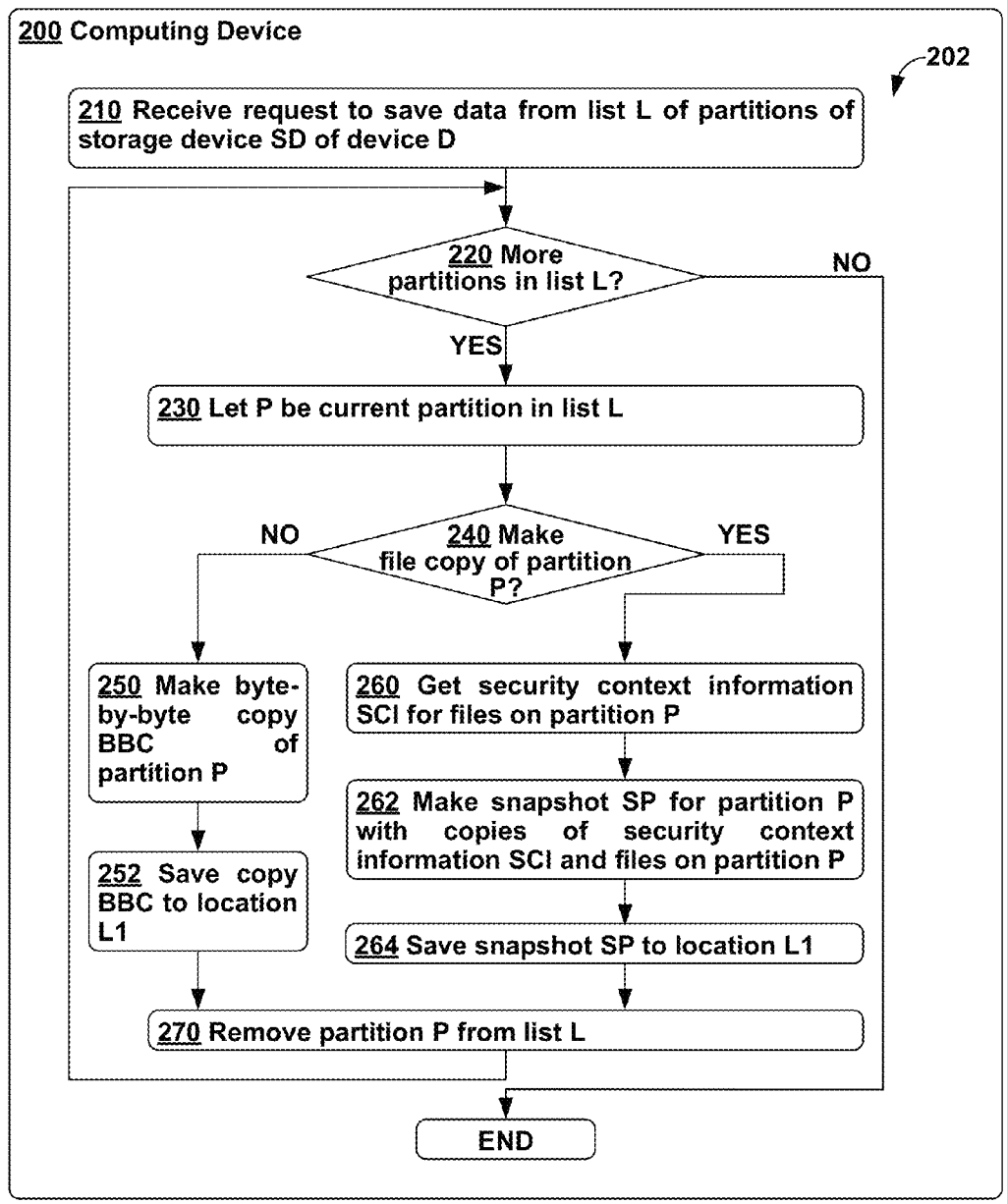
FIG. 2A is a block diagram of another computing device, in accordance with an example embodiment.

FIG. 2A is a block diagram of computing device 200, in accordance with an example embodiment. Computing device 200 can include some or all of the aspects of computing device 800 discussed below in the context of FIG. 8A, including but not limited to one or more processors 803 and data storage such as data storage 804. The data storage of computing device 200 can store computer readable instructions, such as computer readable instructions 806. As illustrated in FIG. 2A, computing device 200 can be configured to carry out at least the features of method 202. For example, data storage of computing device 200 can store computer executable instructions that, when executed by one or more processors of computing device 200, can cause computing device 200 to perform at least the features of method 202.

Method 202 can begin at block 210, where computing device 200 can receive a request to save data from a list L of partitions of a storage device SD of a device D. For example, device D can be a mobile computing device. As another example, device D can be an immobile computing device. The saved data can be part or all of a snapshot of one or more partitions of device D; that is, method 202 can be used to make at least part of a snapshot at least one partition of device D. As used herein, the term "list L" does not necessarily refer to a particular data structure or structures; e.g., the list L can be implemented as a list, linked list, array, object, objects, tree, and/or one or more other data structures. In some embodiments, list L can include and/or be associated with additional information about partitions in list L; e.g., information about locations of partitions in list L, locations for storing software and/or data of partitions in list L, storage techniques associated with partitions in list L, sizes of partitions in list L, etc.

At block 220, computing device 200 can determine whether there are more partitions in list L to be processed. If there are more partitions in list L to be processed, computing device 200 can proceed to block 220. Otherwise, method 202 can end.

At block 230, computing device 200 can selected partition P from list L to be a current partition (e.g., a partition to be processed) of list L.

At block 240, computing device 200 can determine whether to make a file-by-file or byte-for-byte copy of partition P. To make this determination, computing device 200 can retrieve information in a database, retrieve information from list L or another associated list, use programming logic to make one or more determinations based on programming logic without respect to data (i.e., one or more hardcoded determinations), or otherwise determine whether to make a file-by-file or byte-for-byte copy of partition P.

If computing device 200 determines to make a byte-for-byte copy of partition P, computing device can proceed to block 250; otherwise, computing device 200 can determine to make a file-by-file copy of partition P and proceed to block 260.

At block 250, computing device 200 can make a byte-for-byte copy of partition P. For example, computing device 200 can execute a command and/or a script to carry out a "dd" or equivalent command that copies data, byte by byte, from one or more source locations to one or more destination locations. In this example, the source location is partition P of the storage device SD of device D and the destination location is copy BBC of partition P. Copy BBC can be one or more software images, files, regions of memory, and/or other data storage entities that contains the byte-for-byte copy of the partition P.

At block 252, computing device 200 can save copy BBC to a storage location L1. For examples, storage location L1 can include computer-readable storage configured for storing software and/or data of one or more known software configurations of device D. For example, location L1 can be and/or include one or more of: a file of computing device 200, a region of memory of computing device 200, a partition or other data storage entity of computing device 200, a file on another computing device (for example, a storage server, cloud storage device, a database server, and/or a computing device with access to enough data storage to store at least copy BBC), a region of memory of another computing device, a partition or other data storage entity of another computing device, a file, partition, storage entity and/or other storage region of a storage device (for example, a disk drive or drives, a storage area network (SAN), and/or a redundant array of independent disks (RAID)). In particular cases, storage location L1 can be, or include, one or more computing devices and/or one or more storage devices assigned to store byte-for-byte copies, file copies, security context information, and/or other software and/or data for devices in the testing facility.

In some embodiments, the procedures of blocks 250 and 252 can be combined. For example, computing device 200 can store the byte-for-byte copy of partition P to location L1, in one example, by only explicitly making copy BBC at location L1. After completing the procedures of block 252, computing device 200 can proceed to block 270.

At block 260, computing device 200 can get security context information SCI for one or more files F1, F2 . . . Fn on partition P. In some cases, device D can provide security features. Then, security context information SCI can be and/or relate to security contexts that can be used by security features of device D; in one example, the security features can be provided by an operating system of device D, such as a mobile operating system, a tablet operating system, a desktop operating system, or another operating system.

For example, the operating system for device D can enforce access controls for files and optionally other software entities of device D. Then, the partitions of the known software configuration can store files and/or other objects subject to access controls, such as discretionary and/or mandatory access controls. Discretionary access controls can be based on the identity of subjects (e.g., users of device D, threads/processes) and/or groups to which the subjects belong. The access controls can be considered to be discretionary if a subject and/or group with a particular access permission can pass the particular access permission on to other subjects and/or groups, and may for example pass the particular access permissions indirectly through other intermediary subjects and groups.

Mandatory access controls can constrain subjects to perform only certain operations on objects such as files, folders, directories, and/or other software entities (e.g., ports, shared memory segments, input/output (I/O) devices). When a subject attempts an operation on an object subject to mandatory access controls, an authorization rule can examine security attributes in a security policy based on "security contexts" to determine whether or not the operation on the object can be carried out.

A security policy can be stored in a policy file and/or can be a default security policy. The security policy can apply security rules associated with the policy to a security context associated with an object and/or a subject to determine whether or not a subject can perform a particular operation on the object. For example, suppose a user U1 starts a process P1, also referred to a subject, that sends a command to read data from a file F1, also referred to as an object, to an operating system that has an active security policy for file F1. The operating system can apply one or more security rules to examine the security contexts of process P1 and file F1 to determine whether process P1 associated with user U1 can read data from file F1. If all the security rules indicate that process P1 can read data from file F1, then the operating system can allow process P1 to read the requested data from file F1. If at least one security rule indicates that the process P1 cannot read data from file F1, the operating system will deny process P1 from reading data from file F1.

A security context can be associated with a subject or an object. A subject, such as a user or other entity, can be assigned a security context upon login. In some embodiments, the user or other entity can change security context after login. If the user or other entity starts a process or thread, the process or thread can be a subject inheriting the security context of the subject. An object, such as a file, can have its own security context. In some examples, when a subject executes a command represented as a file, some or all aspects of the security context of the command, or object, can supersede the security context of the executing user or other entity, or subject.

In some examples, a security context can include: an identity, one or more roles, one or more domains/types, and one or more levels. The identity of a security context can specify an identity used for security purposes. This identity can be associated with an identity, such as a login name or user core identity, used to access the operating system. For example, a user "U1" can login with the name U1 and a password, and upon successful completion, be associated with a security context identity of "user_u". Other users, such as users U2 and U3, can share the security identity of "user_u", in which case each of users U1, U2, and U3 is associated with the security context identity "user_u". As another example, a user "R1" with root access can be assigned the security context identity "root_u".

Each identity of a security context can be associated with one or more security context roles. Each security context role is then associated with a specific security context domain or type. The operating system of device D can then use the security context domain or type to determine what, if any, access rights to an object are available to a subject operating in a particular security context domain or type. For example, suppose user U1 has security context identity "user_u" and user R1 has security context identity "root_u" as discussed above. The "user_u" identity can be associated with a security context role of "user_r", representing a role of a non-administrative user. The "root_u" identity can be associated with two security context roles: "user_r" and "sysadm_r", representing the role of a system administrator. The security context role "user_r" can be assigned or otherwise associated with the security context domain or type "user_t" and the role "sysadm_r" can be assigned or otherwise associated with the security context domain or type "sysadm_t". Then, if user U1 requests to access a file "root_only" having a domain of "sysadm_t", the request can be denied by the operating system as user U1 is in the "user_r" role that does not have access to files in the "sysadm_t" domain or type. If the user R1 requests access to the file "root_only" while in the "user_r" role, then the request will also be denied by the operating system. In that event, user R1 can change roles to "sysadm_r", repeat the request to access the "root_only" file, and subsequently gain access to the "root_only" file.

A security context can also specify one or more security context levels. More particularly, some mobile and/or other operating systems can provide a confidentiality protection policy that controls access rights to objects based on the specified security context level of the object and corresponding security context level of a subject. More, fewer, and/or different information can be in a security context as well.

The security context for an object can be listed using an operating system list files command such as "ls -Z" that enables listing of security context information, as well as other information, about one or more files or other objects. The security context information can be in the form of a security context label. The security context label can be of the form "id:role:type:level", where id is a security context identifier, role is a security context role, type is a security context domain or type, and level is a security context level or levels. For example the command "ls -Z file1/usr/bin/ssh" can have example output such as:
    unconfined_u:object_r:user_home_t:s0 file1
    sys_u:object_r:ssh_exec_t:s0-s4 /usr/bin/ssh
The security context label "unconfined_u:object_r:user_home_t:s0" for an object "file1" can indicate that the object file1 has a security context identity of "unconfined_u", a role of "object_r", a domain or type of "user_home_t", and a security context level of "s0". The security context label "sys_u:object_r:ssh_exec_t:s0-4" for an object "/usr/bin/ssh" can indicate that the object /usr/bin/ssh has a security context identity of "sys_u", a role of "object_r", a domain or type of "ssh_exec_t", and security context levels of "s0-s4", indicating a range of security context levels from s0 to s4 inclusive. Similar security information can be provided for processes and/or threads using a list processes command of the operating system; e.g., "ps -Z".

Then, to save security context information about one or more objects, the security context information can be obtained using the operating system list files command, such as the "ls" command or an equivalent command depending on device D and/or the operating system of device D. Then, the output of the list files command can be parsed or otherwise processed to obtain the security context labels for the one or more objects. Then, for at least a particular object O1 of the one or more objects, the security context label for object O1, SCL(O1), can in turn be parsed and/or otherwise processed to obtain data for one or more commands to change security context identities, roles, domains/types, and/or levels based on the security context label of O1. These one or more commands to change security context information can then be added to a script or other software, that when executed, restores the security context of the object O1 based on the security context label.

For example, suppose the files "file1" and "/usr/bin/ssh" mentioned above are to be saved as a part of a snapshot. Then, the list files output for file1 can be (as indicated above):
    unconfined_u:object_r:user_home_t:s0 file1
The output can be parsed into a security context label "unconfined_u:object_r:user_home_t:s0" and an object name "file1". The security context label for file1 can be parsed to determine file1's security context identity is "unconfined_u", security context role is "object_r", security context domain or type is "user_home_t", and security context level is "s0". Subsequently, instances of the "chcon" command can be added to the script to set the security context of "file1" to the security context indicated by the security context in the label. Examples of the commands added to the script can be:

chcon -u unconfined_u file1 # assign "unconfined_u" id to file1 from label
    chcon -r object_r file1 # assign "object_r" role to file1 from label
    chcon -t user_home_t file1 # assign "user_home_t" type to file1 from label
    chcon -s0 file1 # assign level "s0" to file1 from label As another example, the following command can perform the same functionality as the above four commands:

chcon unconfined_u:object_r:user_home_t:s0 file1

Then, the list files output for /usr/bin/ssh can be (as indicated above):

sys_u:object_r:ssh_exec_t:s0-s4 /usr/bin/ssh

The output can be parsed into a security context label "sys_u:object_r:ssh_exec_t:s0-s4" and an object name "/usr/bin/ssh". Then, the script can include the following command to restore a security context of /usr/bin/ssh to the security context specified in as the quoted security context label; e.g., chcon sys_u:object_r:ssh_exec_t:s0-s4 /usr/bin/ssh The security context information SCI can be or can include: one or more security context names for one or more of files F1, F2 . . . Fn; security context roles for one or more of files F1, F2 . . . Fn; security context types for one or more of files F1, F2 . . . Fn; security context domains for one or more of files F1, F2 . . . Fn; security context levels for one or more of files F1, F2 . . . Fn; security context labels for one or more of files F1, F2 . . . Fn; and/or other security context information for one or more of files F1, F2 . . . Fn. Security context information SCI can be stored as part of one or more of files F1, F2 . . . Fn and/or separately from one or more of files F1, F2 . . . Fn. For example, security context information SCI for F1, F2 . . . Fn can be stored in: a separate file, such as a security context information file; in a script or other set of one or more commands related to security context information one or more of files F1, F2 . . . Fn; and/or in a database or databases of security context information about one or more of files F1, F2 . . . Fn. Other examples for storing security context information SCI are possible as well.

At block 262, computing device 200 can make a file-by-file copy of partition P. For example, computing device 200 can execute a command and/or a script to carry out a "tar" or equivalent command that copies files from one or more source locations to a destination location. In this example, the source location is partition P of storage device SD of device D, and the destination location is snapshot SP for partition P. Snapshot SP can be one or more software images, files, regions of memory, and/or other data storage entities that store at least the file-by-file copy of the partition P.

At block 264, computing device 200 can save snapshot SP to location L1. Location L1 can be a location, such as location L1 discussed above in the context of block 252. In some contexts, some or all of the procedures of blocks 260, 262, and 264 can be combined. For example, files of partition P and/or security context information for the files of partition P can be copied to location L1. In particular, snapshot SP may be only explicitly formed at location L1. After completing the procedures of block 264, computing device 200 can proceed to block 270.

At block 270, computing device 200 can remove partition P from list L. After removing partition P from list L, computing device 200 can proceed to block 220.

FIG. 2B is a flow chart of another method 280, in accordance with an example embodiment. Method 280 can be used to prepare a device D for operation in a testing facility, such as a testing facility for performing mobile testing as a service. Device D can be or include a computing device, such as computing device 800 discussed below in the context of FIG. 8A. In some embodiments, device D can be a mobile computing device, such as a smart phone. In particular embodiments, device D can be a mobile computing device without a SIM card or other access to a wireless wide area network (WWAN) and/or with any onboard cameras and/or other image capture devices disabled. Ensuring device D does not have access to WWAN can make it more likely that all communications with device D are local communications, which can be more readily controlled by the testing facility. Disabling onboard cameras and/or other image capture devices of device D ensures that software and/or hardware installed on device D at an earlier testing session are less likely to capture images of later testing sessions.

Method 280 can begin at block 282, where debugging access to device D can be enabled. For example, bootloader software, which can be or include software executed on startup of device D before the operating system software is executed, can be enabled. In some embodiments, enabling bootloader software can involve entering a sequence of key and/or button presses on device D. In other embodiments, block 282 can involving enabling remote command access to device D and/or disabling operating system updates for device D.

At block 284, software can be added to and/or changed on device D to monitor and/or enable access to device D (e.g., superuser access, shell access). In some embodiments, some or all of the software can be in binary format.

At block 286, software and/or data can be added to and/or changed on device D so that device D can operate in the testing facility. For example, software and/or data can be added to and/or changed on device D to: specify a location or locations for device D, such as one or more locations related to the testing facility and/or related to an entity performing tests; inhibit sleeping of a display screen during charging; establish communications with other devices, such as local communications routers or other devices involved in test sessions; specify a name and/or other personalization settings for device D, and/or for a variety of other operations. After device D is prepared for use in the testing facility by completing the procedures of blocks 282, 284, and 286, the software and data on device D can be considered to be in a known software configuration, such as a known software configuration ready for testing in the testing facility and/or to participate in mobile testing as a service.

At block 288, computing device 200 and/or one or more other computing devices, can be used to carry out method 202 to save copies of partitions of device D that are in the known software configuration. The copies of partitions of device D can be saved at a location L1, such as discussed above in the context of computing device 200 and/or method 202 of FIG. 2A.

For example, a list of partitions such as "boot", "radio", "recovery", "modem", "modemst1", "modemst2", "cache", "system", and "userdata" can be provided to computing device 200, and/or the other computing devices, as list L of partitions. Some partitions in list L, such as boot, radio, recovery, modem, modemst1, and modemst2 partitions, can be copied using a byte-for-byte storage technique; while the other, or any remaining, partitions can be copied using a file-by-file storage technique. Byte-for-byte and file-by-file storage techniques are discussed above in the context of computing device 200 and method 202 of FIG. 2A.

Reactive Techniques for Restoring Device Software Configurations after Testing

Figure 3A:
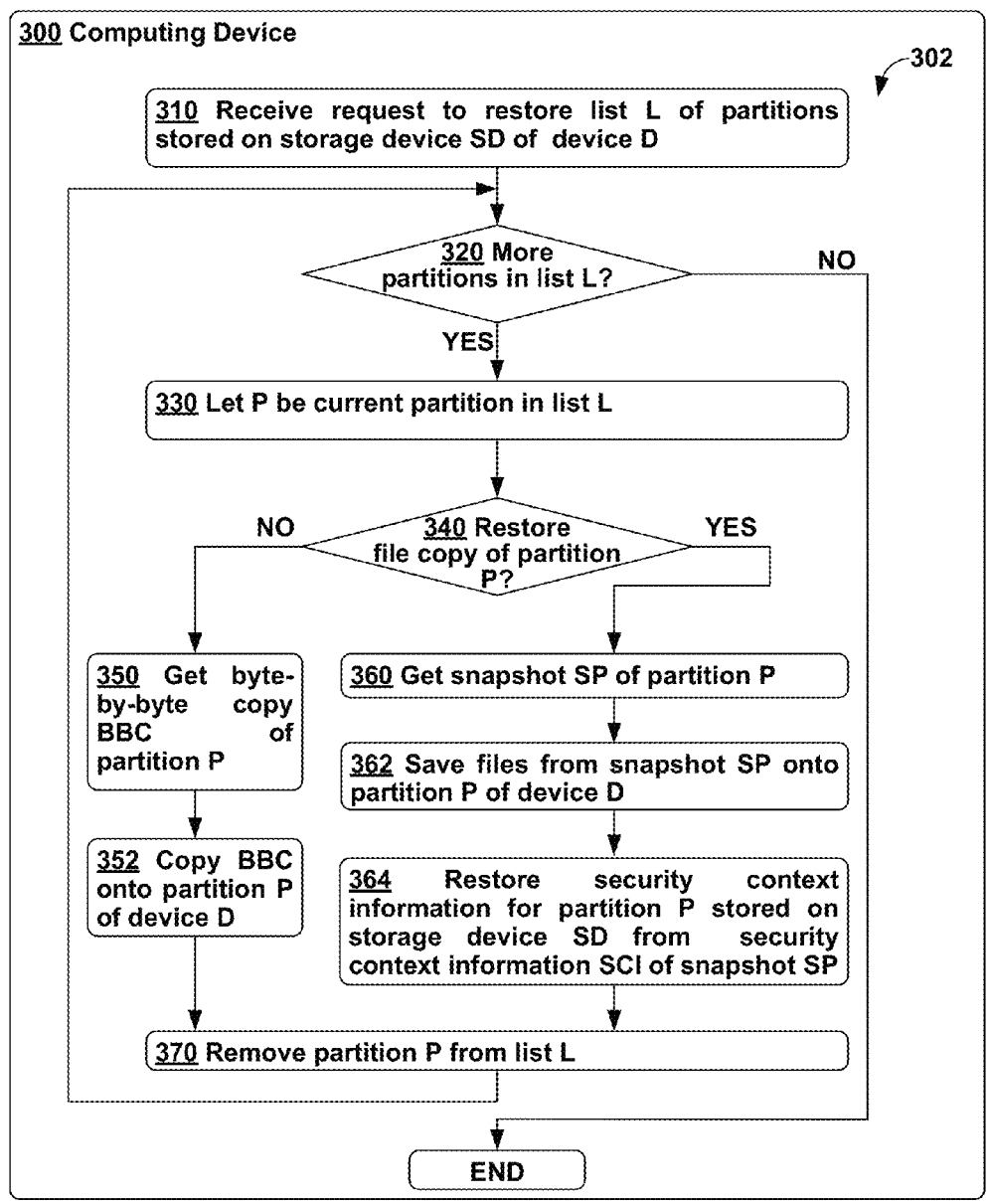
FIG. 3A is a block diagram of yet another computing device, in accordance with an example embodiment.

FIG. 3A is a block diagram of computing device 300, in accordance with an example embodiment. Computing device 300 can include some or all of the aspects of computing device 800 discussed below in the context of FIG. 8A, including but not limited to one or more processors 803 and data storage such as data storage 804. The data storage of computing device 300 can store computer readable instructions, such as computer readable instructions 806. As illustrated in FIG. 3A, computing device 300 can be configured to carry out at least the features of method 302. For example, data storage of computing device 300 can store computer executable instructions that, when executed by one or more processors of computing device 300, can cause computing device 300 to perform at least the features of method 302.

The above-mentioned reactive techniques can purge software (suspicious or otherwise) installed during a testing session. Method 302 can be carried out to perform some or all of the reactive techniques. One reactive technique is to disable communications soon or immediately after a testing session, such as discussed above in the context of precautionary techniques. Another reactive technique includes maintaining an approved list of applications, and optionally a list of other software that is not approved, installed on the devices before the testing session begins. Then, after the testing session, all applications not on the approved list of applications can be uninstalled. A further reactive technique can involve removing data added during the testing session. The removed data include, but are not limited to, data associated with application packages installed during the testing session, data stored on memory cards and/or temporary locations, system debugging data, data generated when an application does not respond, debugging data generated upon unplanned/unsuccessful application completion, such as core dumps and/or tombstones, and data in one or more kernel message buffers.

After a testing session, a testing computing device, which can be a mobile or immobile computing device such as device D mentioned above, can be restored to a known software configuration using a loading computing device. The known software configuration can include a plurality of software components for the testing computing device, such as application software components, data components, and/or other software components. The loading computing device can determine whether to restore a testing computing device to the known software configuration. Then, after determining to restore the testing computing device to the known software configuration, the loading computing device can restore the testing computing device to the known software configuration. Restoring the testing computing device can include obtaining a stored software image that stores at least part of the known software configuration from computer-readable storage (e.g., storage either on the loading computing device or remote from, but accessible to, the loading computing device) the software image. Such software images can be termed "snapshots" herein. The software image can also include security-context data having one or more security contexts associated with the plurality of software components. The loading computing device can storing at least the plurality of software components of the obtained software image onto the testing computing device. Then, after storing the plurality of software components onto the testing computing device, the loading computing device can set one or more security contexts for the plurality of software components stored on the testing computing device using the security-context data stored with the software image.

For example, software components, such as software and/or data, can be stored on one or more partitions of the testing computing device. A snapshot (or snapshots) can store software and/or data residing in those partition(s) when the mobile computing device is in the known software configuration. Then, after a testing session, the software and/or data residing in those partition(s) can be retrieved from the snapshot(s) and copied to the mobile computing device. Then, the software and/or data can be placed in the appropriate partition(s) of the mobile computing device, and the mobile computing device can utilize the known software configuration, for example after the mobile computing device is rebooted.

In some cases, multiple snapshots can be used for devices in the testing facility. For example, suppose device D supports three releases—SuperMOS.R1, SuperMOS.R2, and SuperMOS.R3—of a mobile operating system SuperMOS. Then, at least three snapshots can exist for device D: snapshot SNAP1 storing software and/or data residing in partitions when device D is configured with mobile operating system release SuperMOS.R1 of mobile operating system SuperMOS, snapshot SNAP2 storing software and/or data residing in partitions when device D is configured with mobile operating system release SuperMOS.R2 of mobile operating system SuperMOS, and snapshot SNAP3 storing software and/or data residing in partitions when device D is configured with mobile operating system release SuperMOS.R3 of mobile operating system SuperMOS.

Snapshots can be retrieved from computer-readable storage, such as location L of method 302, based on device type, operating system, and/or operating system release. Continuing this example, suppose device D is manufactured by MFGR and is a model MODEL1 of a mobile computing device. Then, the device type of a computing device can include information about the manufacturer and the model of the computing device; e.g., the device type of D1 can include data indicating device D's manufacturer is MFGR and device D's model is MODEL1. Then, suppose the testing facility has another device D2 where both devices D and D2 have the same device type, and both D and D2 are used during a testing session. For example, the snapshots can be stored in a snapshot database. Snapshots can be retrieved from the snapshot database based on a query or search specifying a device type, operating system, and/or operating system release as one or more keys of the query. A response to the query or search can include (references to) one or more snapshots that store known software configurations, where the (references to) snapshots in the response are retrieved from (and/or refer to) the snapshot database.

Then, to put a known software configuration onto devices D and D2 that is based on release SuperMOS.R2 of mobile operating system SuperMOS, snapshots can be retrieved based on a query or search specifying device type, mobile operating system, and mobile operating system release; e.g., a search for snapshots can involve searching for a snapshot for release SuperMOS.R2 of mobile operating system SuperMOS having a device type for MFGR and MODEL1.

In this example, this search would find snapshot SNAP2. Then, software and/or data for the known software configuration based on release SuperMOS.R2 can be retrieved from SNAP2 and stored on partitions of device D (or D2). After being retrieved, SNAP2 can be cached. Then, to restore device D (or D2), the cached version of SNAP2 can be accessed to retrieve software and/or data for the known software configuration based on release SuperMOS.R2, and the retrieved software and/or data can be stored on the device D (or D2).

Once the retrieved software and/or data for the known software configuration is stored on the mobile computing device, then the mobile computing device can be restored to the known software configuration. In some embodiments, the retrieved software and/or data for the known software configuration can be copied from the snapshot to a particular partition or partitions, and then moved or copied from the particular partition(s) to other partitions that store the retrieved software and/or data when the mobile computing device is in the known software configuration.

For example, the software and/or data can be retrieved from the snapshot and stored on a "discovery" partition (or partitions) using one or more files and/or software images, and the software and/or data can then be copied from the recovery partition(s) to other partitions. For example, suppose the mobile computing device has four partitions: /recovery, /boot, /system, and /usr. Then, the software and/or data for the /boot, /system, and /usr partitions can be retrieved from the snapshot and stored in the /recovery partition. In this example, suppose software and/or data for the /boot partition is retrieved from the snapshot and stored in a software image "boot.img" on the /recovery partition of the mobile computing device, and software and data for the /system and /usr partitions is stored in two respective archive files "sys.tar" and "usr.tar" that are both stored on the /recovery partition of the mobile computing device. Then, a byte-for-byte file copy technique can be used to copy software and/or data from the boot.img file to the /boot partition; e.g., using the "dd" command or the equivalent.

To copy software and/or data onto respective /system and /usr partitions, each respective partition can be "mounted" or made accessible and then software and/or data can be copied from the respective archive file to the respective mounted partition. That is, for the /system partition, the /system partition can be mounted and then software and/or data stored in the sys.tar file stored on the /recovery partition can be copied onto the mounted /system partition. Similarly for the /usr partition, the /usr partition can be mounted and then software and/or data stored in the usr.tar file stored on the /recovery partition can be copied onto the mounted /usr partition.

After a file or files have been restored from a snapshot using byte-for-byte, file-by-file, and or other storage techniques, then the security contexts of some or all of the files can be restored. For example, after a file has been restored to its previous location on device D from a snapshot, then the above-mentioned script or other software can be executed to restore the security contexts of the file restored from the snapshot; e.g., for the file "file1" the commands related to file1 mentioned above in the context of block 260 of method 202 (and reproduced below for convenience) can be executed to restore the security context of the "file1" file:

chcon -u unconfined_u file1 # assign "unconfined_u" id to file1 from label
    chcon -r object_r file1 # assign "object_r" role to file1 from label
    chcon -t user_home_t file1 # assign "user_home_t" type to file1 from label
    chcon -l s0 file1 # assign level "s0" to file1 from label After the script has been executed, the mobile computing device has been restored to the known software configuration stored in the snapshots. Once the mobile computing device has been restored to the known software configuration, the mobile computing device can be considered to be ready for a testing session.

To remove software, which may be problematic if left on a computing device D after a testing session, the following technique can be used. When device D is first introduced to the testing facility, device D can be said to use a basic software configuration. For example, in the basic software configuration, device D can have an operating system as mentioned above and optionally other software and/or data installed at the time of introduction. In some cases, the basic software configuration can come from a manufacturer of device D as a software image, and may be referred to as the factory reset state of Device D. Once device D is at the testing facility, the software image with the basic software configuration can be loaded onto device D.

Then, device D can be prepared for use in the testing facility by enabling access to debugging, boot, and/other software, as well as setting device D up to communicate with devices within the testing facility. Also, software, for example in binary format, can be added to the device to monitor and/or enable access to the device (e.g., superuser access, shell access). After device D is prepared for use in the testing facility, the software on device D can be considered to be in a known software configuration.

Then, one or more partitions storing software and/or data on device D can be saved as one or more snapshots of the device D, where the snapshot saves the known software configuration. For example, partitions that can be saved in the snapshot(s) can include, but are not limited to, boot, recovery, device-specific (e.g., radio, modem), cache, system, and user data partitions. Multiple storage techniques can be used to save the partition(s); i.e., a byte-for-byte copy of a partition, a file-by-file copy of a partition, security context data can be stored for files of a partition as a script or other security context representation.

Once the partition(s) are saved as one or more snapshots, device D can be used in a testing session. After the testing session, the stored partition data can be retrieved from the snapshot(s) and written to device D. In some examples, the stored partition data for one or more partitions P1, P2 . . . Pn is saved on one or more particular partitions PP1, PP2 . . . PPn of device D (e.g., a recovery partition), and then copied to from partitions PP1, PP2 . . . PPn to partitions P1, P2 . . . Pn of device D. After the stored partition data is copied to the appropriate partitions; e.g., partitions P1, P2 . . . Pn, device D can be considered to have been restored to the known software configuration that was stored using the snapshot(s).

In some embodiments, these techniques for restoring a computing device to a known software configuration can be automated; e.g., performed by another computing device operating on the computing device, performed by the computing device to restore itself. These techniques can be used to carry over settings, testing-specific modifications, and other changes made to a basic software configuration to arrive at the known software configuration between testing sessions—these settings, testing-specific modifications, and other changes may be lost if a factory reset and/or restoration to the basic software configuration is performed.

Method 302 can begin at block 310, where computing device 300 can receive a request to restore a list L of partitions of a storage device SD of a device D. The request can be, or include, a request to restore device D to a known software configuration, such as a software configuration that includes software components stored in partitions listed in list L. In some examples, device D can be a mobile computing device.

Then, after receiving the request to restore device D, at least blocks 320-370 of method 302 can be used to restore device D using at least part of a snapshot of (partitions of) device D. Some or all of the partitions in list L of partitions can be restored from saved partitions of device D made by computing device 200 using method 202 discussed above in the context of FIG. 2A.

As used herein, the term "list L" does not necessarily refer to a particular data structure or structures; e.g., the list L can be implemented as a list, linked list, array, object, objects, tree, and/or one or more other data structures. In some embodiments, list L can include and/or be associated with additional information about partitions in list L; e.g., information about locations of partitions in list L, locations for finding stored copies of software and/or data of partitions in list L, storage techniques associated with partitions in list L, sizes of partitions in list L, etc.

At block 320, computing device 300 can determine whether there are more partitions in list L to be processed. If there are more partitions in list L to be processed, computing device 300 can proceed to block 320. Otherwise, method 302 can end.

At block 330, computing device 300 can select partition P from list L to be a current partition (e.g., a partition to be restored) of list L.

At block 340, computing device 300 can determine whether to restore a file-by-file or byte-for-byte copy of partition P. To make this determination, computing device 300 can retrieve information in a database, retrieve information from list L or another associated list, use programming logic to make a (hardcoded) determination, or otherwise determine whether to make a file-by-file or byte-for-byte copy of partition P.

If computing device 300 determines to restore a byte-for-byte copy of partition P, computing device can proceed to block 350; otherwise, computing device 300 can determine to restore a file-by-file copy of partition P and proceed to block 360.

At block 350, computing device 300 can get, or otherwise obtain, a byte-for-byte copy BBC of partition P from storage location L1, such as a byte-for-byte copy of partition P made when device D was in a known software configuration. Copy BBC can be one or more software images, files, regions of memory, and/or other data storage entities that contain the byte-for-byte copy of the partition P. Storage location L1 can be a storage location such as discussed above in the context of block 252 of method 202.

At block 352, computing device 300 can restore partition P from the byte-for-byte copy BBC by copying BBC onto partition P. For example, computing device 300 can execute a command and/or a script to carry out a "dd" or equivalent command that copies data, byte by byte, from a source location (or locations) to a destination location. In this example, the source location is copy BBC of partition P and the destination location is partition P of the storage device SD of device D.

In some embodiments, the procedures of blocks 350 and 352 can be combined; e.g., computing device 300 can restore the byte-for-byte copy of partition P directly from location L1. After completing the procedures of block 352, computing device 300 can proceed to block 370.

At block 360, computing device 300 can get, or otherwise obtain, snapshot SP from location L1. Snapshot SP can be one or more software images, files, regions of memory, and/or other data storage entities that contain a file-by-file copy of the partition P, such as a file-by-file copy of partition P made when device D was in a known software configuration. Copy. Location L1 can be a location such as location L1 discussed above in the context of block 252.

At block 362, computing device 300 can retrieve files of partition P from snapshot SP and restore those files, file-by-file, to partition P of storage device SD of device D. For example, computing device 300 can execute a command and/or a script to carry out a "tar" or equivalent command that copies files from a source location (or locations) to a destination location. In this example, the source location is snapshot SP of partition P and the destination location is partition P of storage device SD of device D.

At block 364, computing device 300 can restore security context information SCI for one or more files F1, F2 ... Fn on partition P of storage device SD of device D. Security context information SCI can be or include security context information, and can be stored in snapshot SP such as discussed above in the context at least block 260 of method 202 and FIG. 2A. For example, the security context information can be a script of one or more instructions that, when executed, can set or otherwise restore the security context information of the files F1, F2 ... Fn on partition P of storage device SD of device D to the security context information of the files F1, F2 ... Fn for the known software configuration of device D stored, in part, by snapshot SP.

In some contexts, some or all of the procedures of blocks 360, 362, and 364 can be combined; e.g., files of partition P and/or security context information for the files of partition P can be retrieved from location L1 and restored to partition P. After completing the procedures of block 364, computing device 300 can proceed to block 370.

At block 370, computing device 300 can remove partition P from list L. After removing partition P from list L, computing device 300 can proceed to block 320.

Figure 3B:
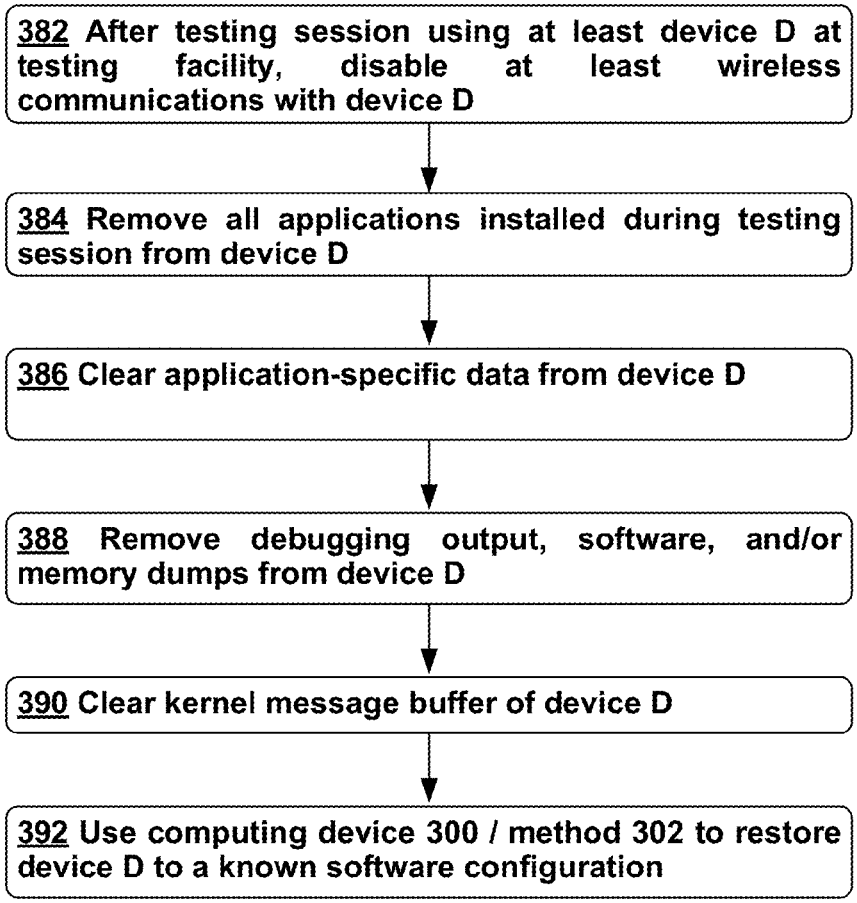
FIG. 3B is a flow chart of another method, in accordance with an example embodiment.

FIG. 3B is a flow chart of method 380, in accordance with an example embodiment. Method 380 can be used to restore a device D to a known software configuration, such as known software configuration for operation in a testing facility; e.g., a testing facility for performing mobile testing as a service. Device D can be or include a computing device, such as computing device 800 discussed below in the context of FIG. 8A. In some embodiments, device D can be a mobile computing device, such as a smart phone. In particular embodiments, device D can be a mobile computing device without a SIM card or other access to a wireless wide area network (WWAN) and/or with any onboard cameras and/or other image capture devices disabled. Ensuring device D does not have access to WWAN can make it more likely that all communications with device D are local communications, which can be more readily controlled by the testing facility. Disabling onboard cameras and/or other image capture devices of device D ensures that software and/or hardware installed on device D at an earlier testing session are less likely to capture images of later testing sessions.

In some examples, device D can be used during a testing session; e.g., a testing session that has been conducted before method 380 begins. In particular examples, the cessation of the testing session can be used as a trigger to start immediate or delayed execution of method 380; e.g, method 380 can begin as soon as the testing session ends, method 380 can begin after a predetermined amount of time (e.g., 30 seconds, 5 minutes, 1 hour) after the testing session ends. In other examples, method 380 can be triggered by input from a user interface; e.g., user interface 620 discussed below in the context of FIG. 6.

Method 380 can begin at block 382, where, after a testing session has been completed that involved use of device D, at least wireless communications access to device D can be disabled. Wireless communications access to device D can be disabled using one or more software commands, hardware switches, and/or other mechanisms. In some embodiments, wireless communications access to device D can be disabled based on a schedule of testing sessions; e.g., wireless communications access to device D can be disabled immediately or soon after a testing session is completed and/or wireless communications access to device D can be disabled by default and then enabled soon before or right as soon as a testing session begins. In some examples, wireless communications access to device D can include local wireless communications access and/or WWAN access. In particular examples, local wireless communications access can include wireless communications using one or more IEEE 802.11 (e.g., Wi-Fi) and/or Bluetooth™ protocols. In still other examples, other types of communications access, such as wired communications access, to device D can be disabled during block 382 as well.

At block 384, all applications, and optionally any other software installed during the testing session, can be removed from device D. For example, a record of applications installed during the testing session can be maintained, and any application installed during the testing session (that is, on the record of applications) can be removed and/or uninstalled after the testing session completes. As another example, a record of pre-existing applications can be maintained. After the testing session, a list of installed applications can be generated, and if an application A1 is on the list of installed applications but is not in the record of pre-existing applications, then application A1 can be removed and/or uninstalled after the testing session completes.

At block 386, application-specific data, and optionally any other data added to device D during the testing session, can be cleared (removed) from device D. For example, files and/or folders/directories created during the testing session can be removed from device D, along with the contents of the created folders/directories. As another example, all data can be cleared from temporary storage locations (e.g., a /tmp folder/directory) but the folder/directory for the temporary storage can be retained. Also, web browser historical data, cookies, bookmarks, etc. created during the testing session can be removed from device D. Further, authentication data, such as tokens or saved passwords, can be purged from device D. Also, any accounts added to device D can be removed after the testing session. Other types of application-specific and/or any other data can be removed from device D as well.

At block 388, debugging output, software, memory dumps, and/or other testing-related data can be removed from device D. For example, one or more debugging logs, files, folder/directories, traces, software tombstones, stack dumps, core dumps, and/or other data can be removed from device D. As another example, breakpoints, testing scripts, and/or other debugging and/or testing-related software and/or data can be removed from device D after the testing session. Also, any software and/or data related to an application not responding can be cleared from device D after the testing session. Other types of debugging output, software, memory dumps, and/or other testing-related data can be removed from device D as well.

At block 390, one or more kernel message buffers of device D can be cleared; that is, one or more messages remaining in a kernel message buffer of device D after the testing session can be removed from device D.

At block 392, method 302, for example, carried out by computing device 300, can be used to restore partitions of device D to a known software configuration. For example, a list of partitions such as "boot" "radio" "recovery" "modem" "modemst1" "modemst2" "cache" "system", and "userdata" can be provided to computing device 300 and/or the other computing device(s) as list L of partitions. Some partitions in list L, such as boot, radio, recovery, modem, modemst1, and modemst2 partitions, can be copied using a byte-for-byte storage technique; while the other (or remaining) partitions can be copied using a file-by-file storage technique. Byte-for-byte and file-by-file storage techniques are discussed above in the context of computing device 300 and method 302 of FIG. 3A.

In some embodiments, method 380 can be carried out by a computing device, such as computing device 200, 300, or 800. The computing device can include some or all of the aspects of computing device 800 discussed below in the context of FIG. 8A, including but not limited to one or more processors 803 and data storage such as data storage 804. The data storage can store computer readable instructions, such as computer readable instructions 806 of computing device 800. For example, data storage of computing device 300 can store computer executable instructions that, when executed by one or more processors of computing device 300, can cause computing device 300 to perform at least the features of method 380. In some embodiments, part or all of method 380 can be performed by the computing device by communicatively coupling with device D and sending one or more commands to device D. Then, upon receiving the command(s), device D can carry out the commands to perform the procedures of blocks 382, 384, 386, 388, 390, and/or 392.

In other embodiments, part or all of methods 202, 280, 302, and/or 380 can be carried out using software instructions, such as one or more scripts that contain instructions that can be interpreted and/or executed by a computing device, such as, but not limited to computing devices 200 and/or 300, to carry out the instructions of the script(s). Table 1 shows such an example script written in pseudo code related to the "sh" shell scripting language. The example script of Table 1 can be used to carry out at least part of methods 202 and/or 302.

The example script listed in Table 1 can make and restore snapshots of partitions of a particular device; e.g., device D of methods 202, 280, 302, and/or 380, where snapshots can store software and/or data of a known software configuration. As such, the example script can save a (known) software configuration of the particular device as one or more snapshots and restore the particular device to a known software configuration stored using the one or more snapshots. In the script below, the particular device is called "device D" and is assumed to be communicatively coupled to the device executing the script (e.g, computing device 200 or 300) before the script starts executing.

In the particular example of Table 1, snapshots can be taken and restored for some or all of three partitions that can store software and/or data of a software configuration; that is, the data, system, and boot partitions. In the example script shown in Table 1, the data and system partitions are file-by-file copied and the boot partition is byte-for-byte copied.

Also, the data and system partitions are mounted (accessible using the filepath) at /data and /system respectively, and the boot partition is accessible via the "/boot" filepath. In other examples, more, fewer, and/or different partitions can be used to store software and/or data of a known software configuration. In still other examples, more, fewer, and/or different partitions can be file-by-file and/or byte-for-byte copied. Other storage techniques for saving and retrieving snapshots of partitions are possible as well; e.g, part or all of one or more snapshots can be compressed/decompressed, part or all of one or more snapshots can be encrypted/decrypted, part or all of one or more snapshots can be stored in and/or retrieved from one or more databases.

```
# The usage function can show command line to call this script
#  usage: usage
function usage() {
  echo "Usage: script [options] action [...]"
  echo "Options:"
  echo " -h Show help."
  echo "Actions:"
  echo "   snapshot"
  echo "   Create a snapshot of software config. for device D."
  echo "   restore"
  echo "   Restore device D from a snapshot."
}

# Reboot device D normally.
#  usage: reboot
function reboot() {
  if (device D is online) then
```

```
    send command to reboot device D remotely
    echo -n "Waiting for device to come online"
    until (the device is online) do
      echo -n .
      sleep 2
    done
    echo "Device rebooted".
  fi
}

# Reboot device D in recovery mode.
#  usage: reboot_recovery
function reboot_recovery() {
  if (device D is not in recovery mode) then
    send command to reboot device in recovery mode
    echo -n "Waiting device D to enter recovery"
    until (device D is in recovery) do
      echo -n .   # create a ... display
      sleep 2
    done
    echo wait for device D to complete rebooting # e.g. sleep x secs.
    send commands to remotely mount partitions of device D
    # e.g., mount /data /system and/or /boot
  fi
}

# Generate script to restore security contexts
# script will be stored on device D
#  usage: make_sc_script script_name device_path ...
```

```
function make_sc_script () {
   script=$1
   device_path=$2
  for [ each line in a file listing of $device_path ] do
    # parse line for dir. name, security context, and file name
    if [ the line is a blank line ] then
       continue # skip blank lines
    elif [ the line represents a directory ] then
       directory=$line # save the line as a directory name
       continue
    elif [ the line is of the form permissions security_context
filename ] then
      set perms to be the first field in the line
      set context to be the second field in the line
      set filename to be the third field in the line
    elif [ the line is of the form permissions username
groupname security_context filename ] then
      set perms to be the first field in the line
      set context to be the fourth field in the line
      set filename to be the fifth field in the line
    else
      error " unrecognized file listing format"
    fi
    # generate line of script to restore security context
    echo "chcon $context \"$directory/$filename\"" >> $script
  done # end of for each line loop
  # now make script executable
  chmod a+x $script
}

# Create next available image directory, based on naming scheme:
```

```
#   YYYYmmddC
# where: YYYY = year,
#        mm = month,
#        dd = day, and
#        C = an (optional) lower-case letter
# Example image directory name for 19 Aug 2015 = 20150819a
# Returns the directory name as $imagedir.

# usage: make_image_directory base
#   base = pathname to created image directory
function make_image_directory() {
  local base=$1
  local datestamp=$(date +%Y%m%d) # generate YYYYmmdd
  # loop to add C to datestamp and create image directory
  for C in '' a b c d e f g h i j k l m n o p q r s t u v w y z; do
     imagedir="$base/$datestamp$C" # name of image directory
     if [ imagedir does not already exist ] then
        mkdir $imagedir # make the $imagedir directory
        return $imagedir # and exit make_image_directory function
     fi
  done  # end of for C loop
  # if here, then could not create image directory
  error "could not create directory"
} function to create byte for byte copy of a partition
usage: snapshot_byte4byte partition_name
function snapshot_byte4byte() {
  partition="$1"
  device_name = /${partition}
```

```
  output_filename="${partition}.bytecopy"
  # make byte-for=byte copy of partition as output_filename
  execute dd if=$device_name of=$output_filename on device D
  # output_filename is stored on particular device = device D
  make copy of output_filename on device executing script
  # example device executing script = computing device 200 / 300
} function to create file by file copy of a partition
usage: snapshot_filesystem partition device_path

function snapshot_filesystem() {
  partition="$1"
  device_path="$2"
  output_filename="${partition}.tar.gz"
  reboot_recovery # reboot the device in recovery mode
  #generate security context script for device_path
  make_sc_script repair_${partition}.sh $device_path
  create output_filename from contents of device_path
  # output_filename is stored on particular device = device D
  make copy of output_filename on device executing script
  # example device executing script = computing device 200 / 300
} function to create snapshot of a list of partitions
Usage: snapshot -p partition
function snapshot() {
  if [not online] then
    error "Device must be online to take a snapshot."
  fi
  # parse command options
```

```
  while [[ $# > 0 ]]; do
    case "$1" in
      -p)   #if first argument is "-p"
        partitions="$2" # one or more partitions in 2$^{nd}$ argument
        shift
      *)
        error "Invalid argument to snapshot"
      esac
  done #end of while loop
  product = device's product property
  build = device's software build property
  make_image_directory $product/$build
  echo "Creating snapshot $imagedir"
  cd $imagedir
# for part = each partition in $partitions
for part in $partitions do
    case "$part" in
      data|system)  # if the partition is file-by-file copied
        snapshot_filesystem $part /$part
        ;;
      boot) # if the partition is byte-for-byte copied
        snapshot_byte4byte $part
        ;;
      *)
        error "snapshot: Unrecognized partition: $part"
        ;;
    esac
  done
} function to restore byte for byte copy of partition
```

```
#  usage: restore_byte4byte partition
function restore_byte4byte() {
  partition="$1"
  device_name = /${partition}
  input_filename="${partition}.bytecopy"
  copy $input_filename onto device D
  # $input_filename is assumed to be stored on device executing
  # script; e.g., computing device 200 or 300
  # restore byte-for=byte copy of partition on device D
  execute dd if=$input_filename of=$device_name on device D
} function to restore file by file copy of partition
usage: restore_filesystem partition device_path
function restore_filesystem() {
  partition="$1"
  device_path="$2"
  image_file="${partition}.tar.gz" # image file
  repair_file="repair_${partition}.sh" # security context script if [ either image_file or repair_file does not exist ] then
      error "Image or repair script not found for $partition"
  fi
  reboot_recovery # reboot device D in recovery mode
  copy $image_file onto device D
  copy $repair_file onto device D

# $image_file and $repair_file are assumed to be stored
  # on device executing script; e.g., computing device 200/300 remove files from $device_path of device D
```

```
    extract files stored in $image_file on device D
    execute $repair_file on device D
    # repair_file restores security contexts of extracted files
} function to restore a list of partitions
usage: restore [-h | --help | -p partitions] imagedir
# where imagedir = an image directory storing snapshot(s)
function restore() {
    if [ device is not online and device not in recovery ] then
        error "Device not found."
    fi
    # set default partition list stored in
    # environment variable AFLASH_PARTITIONS
    partitions="$AFLASH_PARTITIONS"
    # process input parameters
    while [[ $# > 0 ]]; do
        case "$1" in
            -h|--help|help)
                echo "restore [-p partitions] imagedir"
                exit 0
                ;;
            -p)
                partitions=${2//,/ }
                shift
                ;;
            -*)
                error "restore: Invalid argument: $1"
                ;;
            *)
                break;
```

```
      ;;
    esac
    shift
  done
  if [ $# > 1 ] then
      error "restore: Extra arguments: ${@:2}"
  fi
  # assign the image directory from command line
  local imagedir=$1
  # change directory to the image directory
  cd $imagedir
  echo "Restoring from $imagedir"
  for [ each partition in the partition list ] do
    case "$part" in
      data|system)
        restore_filesystem $part /$part
        ;;
      boot)
        restore_byte4byte $part
        ;;
      *)
        error "restore: Unrecognized partition: $part"
    esac
  done
} function to look at contents of a snapshot file
usage: browse snapshot
function browse() {
  ls -d */*/* | while read -r snapshot; do
    if [[ $snapshot == ${1}* ]]; then
```

```
        echo $snapshot
      fi
  done
} function to drive script
usage: main [-h|--help|-d] actions [additional arguments]
#      arguments
#            -h | -- help - display usage information
#            -d - specify directory for script
#      with actions:
#            help - display usage information
#            snapshot - save snapshot(s) of partition(s)
#            restore - restore partition(s) from partitions(s)
#            browse - examine contents of a snapshot
function main() {
  # process arguments to main()
  while [[ $# > 0 ]]; do
    case $1 in
      -h|--help|help)  # process -h | --help | help action
        usage # call usage
        exit 0
        ;;
      -d)
        script_dir=$2
        shift
        ;;
      snapshot|restore|browse) # other actions
        break
        ;;
      *) # invalid argument handling
```

```
            echo "Unrecognized command: $1"
            usage && exit 1
            ;;
    esac
    shift
  done

# process -d directory
# if there are additional arguments,
#    make the specified directory and change to that directory
# otherwise
#    tell user that action was not provided

  if [[ $# > 0 ]]; then
    mkdir -p $script_dir
    cd $script_dir
    $@
  else
    echo "No actions given."
    usage
    exit
  fi
} call main function with command-line arguments
main "$@"
```

Table 1

In Table 1, example function names for the script are shown are shown in a bold font. Starting at the top of the script shown above, the usage function can be used to provide information on how to invoke the script. The reboot function can be used to reboot a device remotely; e.g., device D of method 280 or method 380. The reboot_recovery function can be used to reboot the device remotely in recovery mode; e.g., device D of method 280 or method 380. The make_sc_script function can be used to generate another script named in the function as "$script". When the generated script is later executed, the generated script can be used to restore security contexts to one or more files via execution of one or more "chcon" commands.

The make_image_directory function can be used to create an image directory (folder) on the device executing the script (e.g., computing device 200, computing device 300). The image directory can store snapshots and/or other information related to a known software architecture of device D. The snapshot_byte4byte function can be used to create a byte for byte copy of a partition of device D; e.g., the boot partition for the script in Table 1, and send the byte for byte copy to the device executing the script. For example, a command such as the "dd" command can be used to make a byte-for-byte copy of a partition on device D and save the copy in a designated file. Once saved, the designated file can be sent from device D to the device executing the script.

The snapshot_filesystem function can be used to create a file by file copy of a partition; e.g., the system and data partitions for the script in Table 1, and send the file by file copy to the device executing the script. For example, a command such as the "tar" command can be used to create a file that stores an archived copy of some or all of the files in a partition of device D. Once created, the archived copy can be sent from device D to the device executing the script. The snapshot function can be used to create copies of one or more partitions of device D and save the copies into the image directory of the device executing the script. Table 1 shows that the snapshot function calls the make_image_directory to create a directory to store files for the snapshot, and then calls snapshot_byte4byte and snapshot_filesystem functions as needed to make copies of the one or more partitions in the created directory. That is, the snapshot function can be used to make a copy of a known software configuration, where software and data of the known software configuration are stored in the one or more partitions provided as arguments to the snapshot function.

The restore_byte4byte function can be used to restore a partition using a byte for byte copy; e.g., restore the boot partition as indicated in the script of Table 1. For example, a command such as the "dd" command can be used to copy, byte-for-byte, data stored in a designated file to a designated partition, where the designated file can be originally stored on the device executing the script and copied to device D before the "dd" command is executed. The restore_filesystem function can be used to restore a partition using a file by file copy; e.g., restore the system and data partitions as indicated in the script of Table 1. For example, a command such as the "tar" command can be used to copy the files archived in a designated file to the partition, where the designated file archiving files can be originally stored on the device executing the script and copied to device D before the "tar" command is executed. The restore function can be used to copy data from files stored in an image directory to one or more partitions. Table 1 shows that the restore function calls restore_byte4byte and restore_filesystem functions as needed to copy data from stored files to the one or more partitions. That is, the restore function can be used to restore a copy of software and data of a known software configuration to one or more partitions of the device, where the one or more partitions provided as arguments to the restore function. The browse function can be used to examine a snapshot file.

The main function can be used coordinate, or drive, the various functions of example script based on command line options provided to the script. The last line of the script— main "$@"—calls the main function with the command line options provided to the script. Additional information about the functions in the example script can be found in Table 1.

Figure 4:
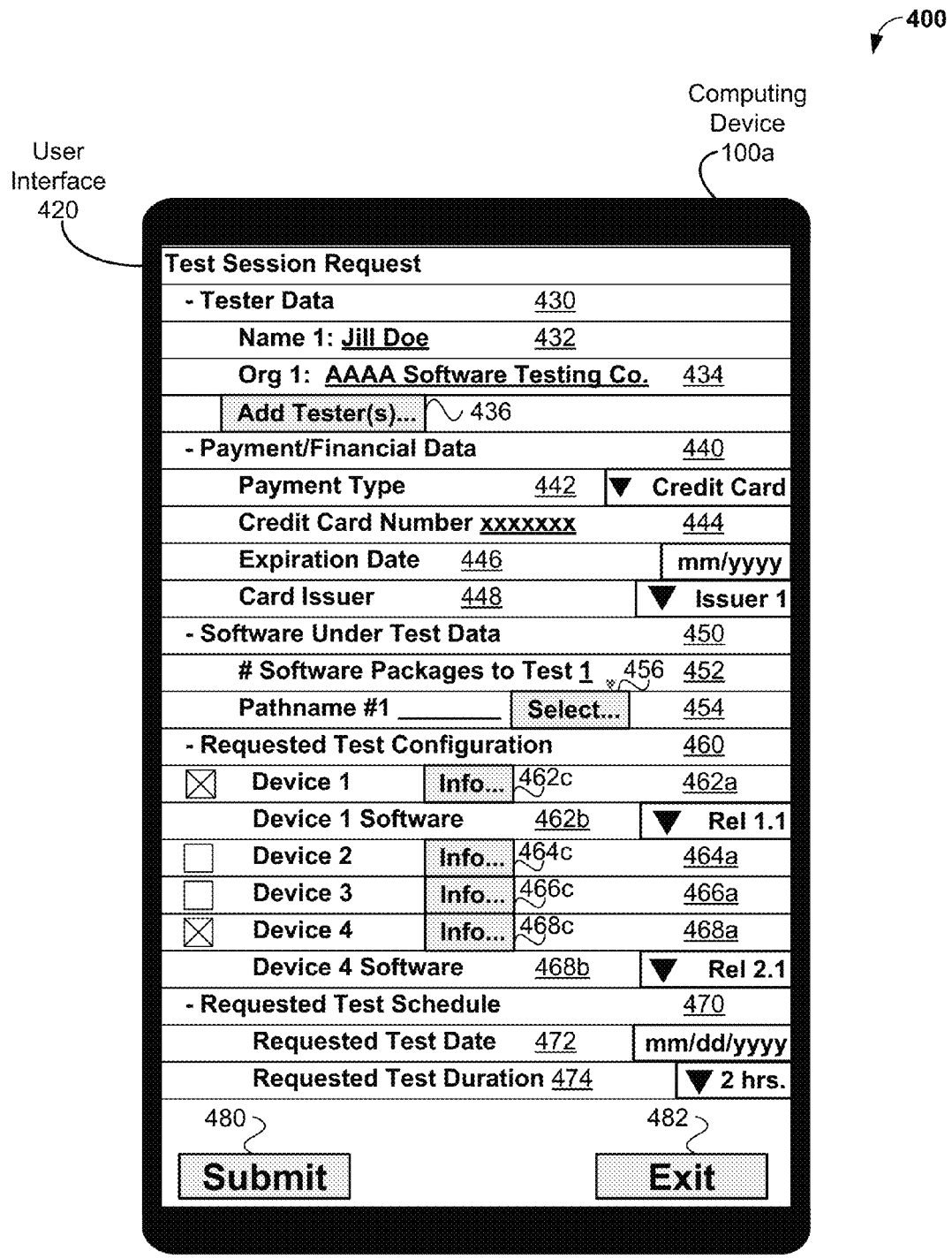
FIG. 4 depicts a user interface of a still another computing device, where the user interface is configured for requesting a testing session, in accordance with an example embodiment.
Figure 5:
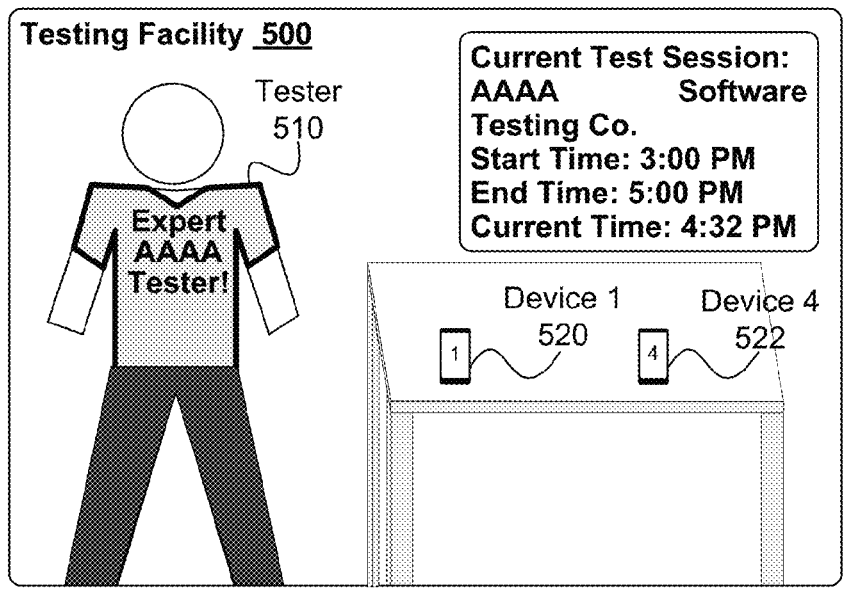
FIG. 5 shows an example testing session in a testing facility, in accordance with an example embodiment.
Figure 6:
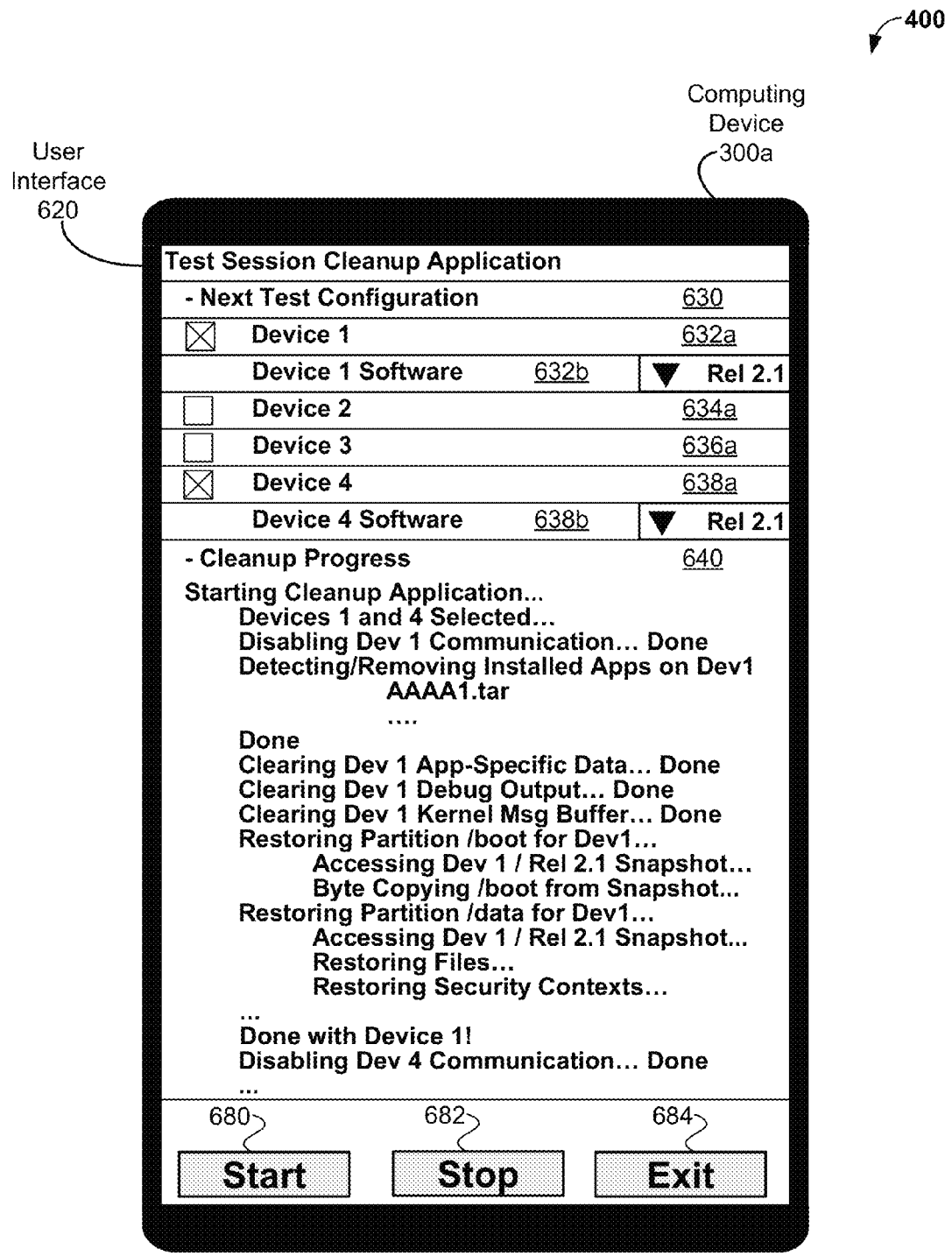
FIG. 6 depicts another user interface of even another computing device, where the user interface is configured for restoring computing devices in the testing facility to a known software environment after the testing session of FIG. 5, in accordance with an example embodiment.

FIGS. 4, 5, and 6 depict aspects of scenario 400. Scenario 400 involves requesting a testing session at a testing facility providing mobile testing as a service, conducting the testing session, and post-testing-session restoration of devices involved in the testing session to known software configurations.

FIG. 4 depicts user interface 420 of computing device 100a, in accordance with an example embodiment. Computing device 100a can include some or all of the above-mentioned features of computing device 100 discussed above in the context of FIG. 1. In some embodiments, computing device 100a and/or user interface 420 can be used to carry part or all of method 102 discussed above in the context of FIG. 1.

In particular, computing device 100a can include some or all of the aspects of computing device 800 discussed below in the context of FIG. 8A, including but not limited to a user interface module such as user interface module 801, one or more processors 803, and data storage such as data storage 804. The data storage of computing device 100a can store computer readable instructions, such as computer readable instructions 806 of computing device 800 discussed below in the context of FIG. 8A. The computer readable instructions of computing device 100a can, when executed by the one or more processors of computing device 100a, cause computing device 100a to perform at the least the herein-described functions of user interface 420. Also, the user interface module of computing device 100a can include software and/or hardware configured to provide user interface 420. For example, the user interface module can include a display, touch screen, and/or other input devices, and hardware and/or software for providing user interface 420.

During scenario 400, user interface 420 of computing device 100a can be used to request a testing session at a testing facility providing mobile testing as a service. FIG. 4 shows that user interface 420 is an interface for a "Test Session Request" and includes regions for reviewing, updating, deleting, and/or inserting tester data 430, payment/financial data 440, software under test data 450, requested test configuration data 460, and requested test schedule data 470. In other examples, more, less, and/or different data can be reviewed, updated, deleted, and/or inserted using user interface 420.

Tester data 430 can be used to review, update, delete, and/or insert data about a tester and/or testing entity requesting to conduct a testing session. In scenario 400, and as shown in FIG. 4, tester data 430 can include, for each tester and/or testing entity, name information 432 and organization information 434, where organization information 434 can indicate a name of an organization or other entity associated with the tester that is named using name information 430. In the example shown in FIG. 4, one tester "Jill Doe" named using named information 432 associated with "AAAA Software Testing Co." named using organization information 434 would be present at the requested testing session, if the testing session request is approved. User interface 420 includes button 436 for adding tester(s) to the testing session request. In some examples, all of the testers requesting to conduct a testing session will be associated with the same entity, while in other examples, the testers can be associated with two or more entities.

More, less, and/or different tester data can be provided than indicated as tester data 430; e.g., job title/position, employee numbers, contact information such as e-mail, phone, and/or physical address information, information about a tester's credentials (e.g., educational credentials, employment information). In some embodiments, some or all of tester data 430 can be used by a computing device, such as computing device 100, to carry out at least part of method 102; e.g., the procedures of block 120 of method 102.

Payment/financial data 440 can be used to review, update, delete, and/or insert financial information related to a request to conduct a testing session. In scenario 400, and as shown in FIG. 4, payment/financial data 440 can include payment type information 442, credit card number information 444, expiration date information 446, and card issuer information 448. Payment type information 442 can specify a method for payment for conducting a testing session; e.g., a credit card, a check, direct withdrawal from a bank account, account number with the entity providing the testing facility and/or mobile testing as a service, etc. In the example shown in FIG. 4, payment type information 442 indicates that a credit card would be used to pay for the requested testing session. In the example shown in FIG. 4 for scenario 400, no specific credit card number, expiration date, or issuer information is shown in respective credit card number information 444 and expiration date information 446, and card issuer information 448.

In other scenarios where other methods for payment are selected using payment type information 442, some or all of credit card number information 444, expiration date information 446, and card issuer information 448 can change accordingly; e.g, if payment type information 442 indicates that a bank account withdrawal would be used to pay for the requested testing session, then credit card number information 444 can become bank account information, expiration date information 446 can be disabled as unused and so indicated via user interface 420 (e.g., expiration date information 446 can be grayed out), and card issuer information 448 can become bank name information. Many other examples of payment methods and related information are possible as well.

More, less, and/or different payment/financial data can be provided than indicated as payment/financial data 440; e.g., additional financial references/information, information about a payee for a check, financial transaction information (e.g., wire transfer information), actual or estimated costs for the requested testing session. In some embodiments, some or all of payment/financial data 440 can be used by a computing device, such as computing device 100, to carry out at least part of method 102; e.g., the procedures of block 130 of method 102.

Software under test data 450 can be used to review, update, delete, and/or insert data about software to be tested during a requested testing session. In scenario 400, and as shown in FIG. 4, tester data 450 can include a number of software packages data 452. In scenario 400, a software package can include one or more software applications and/or other software, along with installation tools and/or data to prepare the software for use/testing on a device during the requested testing session. More, less, and/or different software under test data can be provided than indicated as software under test data 450; e.g., software language(s) used to write the software under test, libraries accessed/used by the software under test.

Then, for each software package to be tested during the requested testing session as indicated by number of software packages data 452, pathname data 454 can indicate a path or other information to locate a copy of the software package to be tested. For scenario 400, one software package is to be tested as indicated by number of software packages data 452 being set to "1", and the pathname for the software package to be tested is yet unspecified by pathname data 454. To help specify a pathname for the software package to be tested, select button 456 can be pressed or otherwise selected—upon this selection, a file dialog or other user interface control can be presented to allow a user of user interface 420 to choose a file containing the software package from a file system. More, less, and/or different software under test data can be provided than indicated as software under test data 450; e.g., a package name, a date for providing the package, a control indicating that a software package may change at time of testing. In some embodiments, some or all of software under test data 450 can be used by a computing device, such as computing device 100, to carry out at least part of method 102; e.g., the procedures of block 140 of method 102.

Requested test configuration data 460 can be used to review, update, delete, and/or insert data selecting one or more computing devices and one or more corresponding software releases for the testing session. In scenario 400, and as shown in FIG. 4, four mobile computing devices—"Device 1", "Device 2", "Device 3", and "Device 4"—are available at the testing facility for mobile testing as a service. Selection controls 462a, 464a, 466a, 468a, shown as check boxes on FIG. 4, can be used to respectively select Device 1, Device 2, Device 3, and Device 4 in a test configuration for the requested testing session. In scenario 400, selection controls 462a and 468a each are shown with an "X" to indicate that respective devices Device 1 and Device 4 are selected to be part of a test configuration for the testing session. More, less, and/or different requested test configuration data can be provided than indicated as requested test configuration data 460; e.g., data about other requested conditions of the testing facility (temperature, ambient sound levels, other apparatus besides computing devices), requested testing facility location(s) in conditions where multiple testing facilities are available.

User interface 420 can be configured to request additional information about a device selected to be part of the requested test configuration. For example, as Device 1 is selected for the requested test configuration by selection control 462a, user interface 420 can be updated to provide software selection control 462b to select a requested software release to be installed on Device 1 at the onset of the requested testing session. Similarly, as Device 4 is selected for the requested test configuration by software selection control 468a, user interface 420 can provide software selection control 468b to select a requested software release to be installed on Device 4 at the onset of the requested testing session. In scenario 400, and as shown in FIG. 4, respective software selection controls 462b, 468b can be used to request that respective software releases "Rel 1.1", "Rel 2.1", are respectively installed on respective devices Device 1, Device 4 at the onset of the requested testing session.

Info buttons 462c, 464c, 466c, 468c can, when selected/pressed, provide additional data about respective devices Device 1, Device 2, Device 3, and/or Device 4. The additional data can include, but is not limited to, device type (manufacturer and/or model) information, hardware-related information (e.g., number, functionality, device type information, clock speed, power usage, and/or other information) about processors, sensors, and/or other hardware components of the device; amount, speed, and/or other information about memory provided by the device; and device communication information (e.g., bandwidth information, communications protocols used by the device). In some cases, requested test configuration data 460 can be used to help set up a testing facility for a requested testing session; e.g., by specifying which devices and respective software releases to be used during a requested testing session.

Requested test schedule data 470 can be used to review, update, delete, and/or insert data related to scheduling a requested testing session. In scenario 400, and as shown in FIG. 4, requested test schedule data 470 can include requested test date information 472 and requested test duration information 474. More, less, and/or different requested test schedule data can be provided than indicated as requested test schedule data 470; e.g., backup times and/or dates, specification of multi-day and/or multi-duration testing sessions, requests for periodic (e.g., weekly, bi-weekly, monthly, quarterly, annually) testing sessions. FIG. 4 show that requested test date information 472 is yet unspecified, is to be provided in mm/dd/yyyy format, and that a duration of "2 hrs." has been selected using requested test duration information 474.

Requested test configuration data 460 and/or requested test schedule data 470 can be used to determine availability of a testing facility for a particular testing session, where the particular testing session can involve use of specified devices, software configurations, dates, and/or durations. In some cases, requested test configuration data 460 and/or requested test schedule data 470 can be used to schedule the testing session once availability of the testing facility for the requested particular testing session has been established. Many other uses of data for test sessions requests are possible as well.

User interface 420 also includes submit button 480 and exit button 482. When selected, submit button 480 can be used to send data for a test session request (specified using user interface 420) for evaluation and approval; e.g., to be approved using computing device 100 and/or 100a and/or using some or all of the techniques of method 102. Exit button 482 can be used to close user interface 420 without submitting a test session request—that is, stop requesting a testing session using user interface 420.

Scenario 400 continues with the testing session request made using user interface 420 being approved and scheduled. FIG. 5 shows an example testing session of scenario 400 in a testing facility 500, in accordance with an example embodiment. The testing session involves tester 510 from the AAAA Software Testing Company testing applications using requested devices 1 and 4, shown as respective devices 520 and 522, in testing facility 500. Testing facility 500 also has a display indicating that the example testing session is being conducted by the AAAA Software Testing Company, that the starting time of the testing session is 3:00 PM, the ending time of the testing session is 5:00 PM, and the current time is 4:32 PM; that is, tester 510 has about twenty-eight minutes left in the testing session. Scenario 400 continues with the testing session depicted in FIG. 5 completing at 5:00 PM and tester 510 leaving the testing facility. Scenario 400 continues with devices 1 and 4 of testing facility 500 being restored to respective known software configurations after the testing session depicted in FIG. 5 is completed.

FIG. 6 depicts user interface 620 of computing device 300a, in accordance with an example embodiment. Computing device 300a can include some or all of the above-mentioned features of computing device 300 discussed above in the context of FIG. 3A. In some embodiments, Computing device 300a and/or user interface 620 can be used to carry part or all of method 302 discussed above in the context of FIG. 3A and/or method 380 discussed above in the context of FIG. 3B.

In particular, computing device 300a can include some or all of the aspects of computing device 800 discussed below in the context of FIG. 8A, including but not limited to a user interface module such as user interface module 801, one or more processors 803, and data storage such as data storage 804. The data storage of computing device 300a can store computer readable instructions, such as computer readable instructions 806 of computing device 800 discussed below in the context of FIG. 8A. The computer readable instructions of computing device 300a can, when executed by the one or more processors of computing device 300a, cause computing device 300a to perform at the least the herein-described functions of user interface 620. Also, the user interface module of computing device 300a can include software and/or hardware configured to provide user interface 620; e.g., the user interface module can include a display, touch screen, and/or other input devices, and hardware and/or software for providing user interface 620.

During scenario 600, user interface 620 is configured for restoring computing devices in testing facility 500 to a known software environment after the testing session depicted in FIG. 5. FIG. 6 shows that user interface 620 is an interface for a "Test Session Cleanup Application" and includes regions for reviewing, updating, deleting, and/or inserting data for a next test configuration 630 as well as a cleanup progress window 640 for reviewing progress of a test cleanup application. In other examples, more, less, and/or different data can be reviewed, updated, deleted, and/or inserted using user interface 620.

Data for next test configuration 630 can be used to review, update, delete, and/or insert data selecting one or more computing devices and one or more corresponding software releases for restoration after a testing session; e.g, testing session 500. In scenario 400, and as shown in FIG. 6, four mobile computing devices—"Device 1", "Device 2", "Device 3", and "Device 4"—are available at the testing facility for mobile testing as a service. Selection controls 632a, 634a, 636a, 638a, shown as check boxes on FIG. 6, can be used to respectively select Device 1, Device 2, Device 3, and Device 4 for restoration after a testing session. In scenario 400, selection controls 632a and 638a each are shown with an "X" to indicate that respective devices Device 1 and Device 4 are selected to be restored after the testing session.

User interface 620 can be configured to provide additional information about a device selected to be restored after a testing session. For example, as Device 1 is selected for the requested test configuration by selection control 632a, user interface 620 can be updated to provide software selection control 632b to select a requested software release to be installed on Device 1 after the testing session, and so restore Device 1 to a known software configuration based on the requested software release indicated by software selection control 632b. Similarly, as Device 4 is selected for the requested test configuration by software selection control 638a, user interface 620 can provide software selection control 638b to select a requested software release to be installed on Device 4 to select a requested software release to be installed on Device 4 after the testing session. In scenario 400, and as shown in FIG. 6, respective software selection controls 632b, 638b can be used to indicate that known software configurations for respective devices Device 1, Device 4 based on software release "Rel 2.1" be installed on the respective devices after the testing session.

More, less, and/or different requested test configuration data can be provided than indicated as next test configuration data 630; e.g., data about testing facility location(s) where the devices are located, scheduling information for device restoration (e.g., restoration time and/or date information). In some embodiments, once a test session is approved, some or all next test configuration data 630 can be populated to restore the devices used during the approved test session based on devices selected as test configuration data 460 shown in FIG. 4; for example, since Devices 1 and 4 were selected via test configuration data 460, then next test configuration data 630 can be populated to select Devices 1 and 4 for restoration after testing session 500 is completed. As another example, if a testing session that is subsequent to testing session 500 is approved, then devices and software releases for next test configuration data 630 can be populated with the test configuration data 460 for the subsequent approved testing session.

User interface 420 also includes start button 680, stop button 682 and exit button 684. When selected, submit button 480 can be used to initiate a procedure for restoring devices selected using next test configuration data 630; e.g., the procedure for restoring devices can include using computing device 300 and/or 300a and/or using some or all of the techniques of method 300, method 380, and/or aspects of the script of Table 1 related to restoring devices. Stop button 682 can be used to pause and/or stop the procedure for restoring devices after a testing session. Exit button 684 can be used to close user interface 620.

In some embodiments, stop button 682 can pause the procedure for restoring devices; e.g., to wait for a device to be powered up or otherwise be made available for restoration. In these embodiments, stop button 682 may change to a "Continue" button that, when selected, can restart the procedure for restoring devices at the point where the procedure for restoring devices was previously paused. In other embodiments, stop button 682 can immediately stop (e.g., kill) the procedure for restoring devices. In still other embodiments, both pause/continue and stop controls can be provided as part of user interface 620.

In scenario 400, start button 680 has been selected to restore Devices 1 and 4 after testing session 500, and a procedure for restoring Devices 1 and 4 has begun, as indicated in cleanup progress window 640. Cleanup progress window 640 shows that the procedure for restoring devices has begun for Devices 1 and 4. Then, for Device 1, communication was disabled (e.g., block 382 of method 380 was performed), applications were removed (e.g., block 384 of method 380 was performed), application-specific data was removed (e.g., block 386 of method 380 was performed), debugging data was removed (e.g., block 388 of method 380 was performed), and Device 1's kernel message buffer was cleared (e.g., block 390 of method 380 was performed). Then, cleanup progress window 640 shows that at least a /boot partition and a /data partition were restored to a known software configuration based on "Rel 2.1"—the /boot partition was restored using a byte-for-byte copying technique and the /data partition was restored using a file-by-file copying technique (e.g., block 392 of method 380 and/or method 302 was performed).

Cleanup progress window 640 shows that, after Device 1 was restored to a known software configuration, the procedure for restoring devices started for Device 4, by disabling communication with the device. After Device 4 is restored to a known software configuration based on the requested "Rel 2.1" software release, scenario 400 can be completed.

Example Data Network

Figure 7:
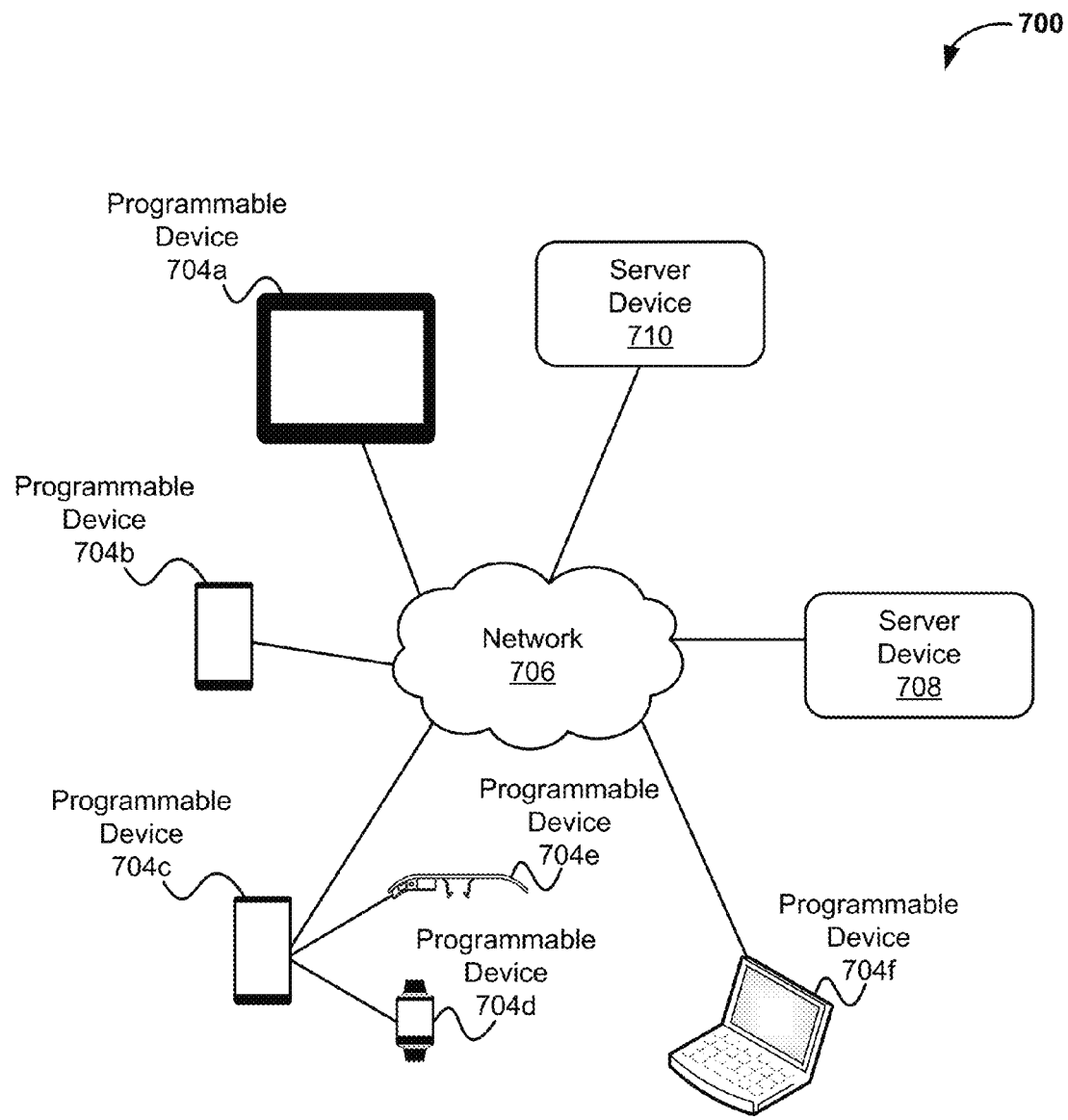
FIG. 7 depicts a distributed computing architecture, in accordance with an example embodiment.

FIG. 7 depicts a distributed computing architecture 700 with server devices 708, 710 configured to communicate, via network 706, with programmable devices 704a, 704b, 704c, 704d, 704e, and 704f, in accordance with an example embodiment. Network 706 can correspond to a LAN, a wide area network (WAN), a corporate intranet, the public Internet, or any other type of network configured to provide a communications path between networked computing devices. Network 706 can also correspond to a combination of one or more LANs, WANs, corporate intranets, and/or the public Internet.

Although FIG. 7 shows six programmable devices, distributed computing architecture 700 can serve more or fewer programmable devices. Moreover, programmable devices 704a, 704b, 704c, 704d, 704e, and 704f (or any additional programmable devices) may be any sort of computing device, such as an ordinary laptop computer, desktop computer, wearable computing device, mobile computing device, head-mountable device, network terminal, wireless communication device (e.g., a smart phone or cell phone), and so on. In some embodiments, such as indicated with programmable devices 704a, 704b, 704c, and 704f, programmable devices can be directly connected to network 706. In other embodiments, such as indicated with programmable devices 704d and 704e, programmable devices can be indirectly connected to network 706 via an associated computing device, such as programmable device 704c. In this example, programmable device 704c can act as an associated computing device to pass electronic communications between programmable devices 704d and 704e and network 706. In still other embodiments not shown in FIG. 7, a programmable device can be both directly and indirectly connected to network 706.

Server devices 708, 710 can be configured to perform one or more services, as requested by programmable devices 704a-704f. For example, server device 708 and/or 710 can provide content to programmable devices 704a-704f. The content can include, but is not limited to, web pages, hypertext, scripts, binary data such as compiled software, images, audio, and/or video. The content can include compressed and/or uncompressed content. The content can be encrypted and/or unencrypted. Other types of content are possible as well.

As another example, server device 708 and/or 710 can provide programmable devices 704a-704f with access to software for database, search, computation, graphical, audio, video, World Wide Web/Internet utilization, and/or other functions. Many other examples of server devices are possible as well.

Computing Device Architecture

Figure 8A:
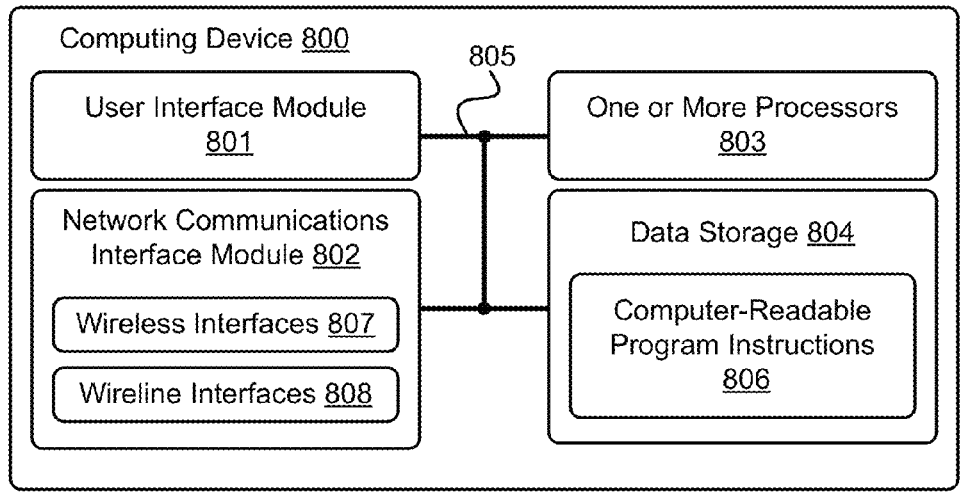
FIG. 8A is a block diagram of a yet even another computing device, in accordance with an example embodiment.

FIG. 8A is a block diagram of a computing device 800 (e.g., system) in accordance with an example embodiment. In particular, computing device 800 shown in FIG. 8A can be configured to perform one or more functions related to computing devices 100, 100a, 200, 300, 300a, methods 102, 202, 280, 302, 380, 900, user interfaces 420, 620, testing facility 500, devices 520, 522, scenario 400, network 706, server devices 708, 710, one or more testing sessions, and programmable devices 704a, 704b, 704c, 704d, 704e, and 704f.

A computing device, such as computing device 800, can be or include any machine performing calculations automatically, and examples include, but are not limited to, desktop computers, laptop computers, tablets, mobile phones, smart phones, watches, smart watches, headsets, and HMDs such as smart glasses. A mobile computing device is any computing device that includes a mobile source of power, such as a battery and/or is configured to be readily transported—examples include, but are not limited to, laptop computers, tablets, mobile phones, smart phones, watches, smart watches, headsets, vehicle infotainment system, and HMDs. An immobile computing device is a computing device that is not a mobile computing device—examples include, but are not limited to, desktop computers, rack-mounted computers/servers, mainframe computers, home entertainment systems, smart thermostats, and appliance computers. A wearable computing device is a computing device configured to be readily transported or carried on and/or by a person or animal—examples include, but are not limited to, mobile phones, smart phones, watches, smart watches, headsets, and HMDs.

Computing device 800 may include a user interface module 801, a network-communication interface module 802, one or more processors 803, and data storage 804, all of which may be linked together via a system bus, network, or other connection mechanism 805.

User interface module 801 can be operable to send data to and/or receive data from exterior user input/output devices. For example, user interface module 801 can be configured to send and/or receive data to and/or from user input devices such as a keyboard, a keypad, a touch screen, a computer mouse, a trackball, a joystick, a camera, a voice recognition module, and/or other similar devices. User interface module 801 can also be configured to provide output to user display devices, such as one or more cathode ray tubes (CRT), liquid crystal displays (LCD), light emitting diodes (LEDs), displays using digital light processing (DLP) technology, printers, light bulbs, and/or other similar devices. User interface module 801 can also be configured to generate audible output(s), such as a speaker, speaker jack, audio output port, audio output device, earphones, and/or other similar devices. In some embodiments, user interface module 801 can be configured to perform some or all of the herein-described functions of user interface 420 and/or user interface 620.

Network-communications interface module 802 can include one or more wireless interfaces 807 and/or one or more wireline interfaces 808 that are configurable to communicate via a network, such as network 706 shown in FIG. 7. Wireless interfaces 807 can include one or more short range and/or wide area wireless transmitters, receivers, and/or transceivers, such as a Bluetooth™ transceiver, a ZigBee™ transceiver, an IEEE 802.11/Wi-Fi transceiver, a WiMAX transceiver, cellular, and/or other similar type of wireless transceiver configurable to communicate via a wireless network. Wireline interfaces 808 can include one or more wireline transmitters, receivers, and/or transceivers, such as an Ethernet transceiver, a Universal Serial Bus (USB) transceiver, or similar transceiver configurable to communicate via a twisted pair wire, a coaxial cable, a fiber-optic link, or a similar physical connection to a wireline network.

In some embodiments, network communications interface module 802 can be configured to provide reliable, secured, and/or authenticated communications. For each communication described herein, information for ensuring reliable communications (i.e., guaranteed message delivery) can be provided, for example as part of a message header and/or footer (e.g., packet/message sequencing information, encapsulation header(s) and/or footer(s), size/time information, and transmission verification information such as CRC and/or parity check values). Communications can be made secure, for example, by encoding or encrypting, and/or decrypting and decoding, using one or more cryptographic protocols and/or algorithms, such as, but not limited to, DES, AES, RSA, Diffie-Hellman, and/or DSA. Other cryptographic protocols and/or algorithms can be used as well or in addition to those listed herein to secure and then recover communications.

Processors 803 can include one or more general purpose processors and/or one or more special purpose processors (e.g., central processing units, digital signal processors, graphics processing units, application specific integrated circuits, etc.). Processors 803 can be configured to execute computer-readable program instructions 806 that are contained in the data storage 804 and/or other instructions as described herein.

Data storage 804 can include one or more computer-readable storage media that can be read and/or accessed by at least one of processors 803. The one or more computer-readable storage media can include volatile and/or non-volatile storage components, such as optical, magnetic, organic or other memory or disc storage, which can be integrated in whole or in part with at least one of processors 803. In some embodiments, data storage 804 can be implemented using a single physical device (e.g., one optical, magnetic, organic or other memory or disc storage unit), while in other embodiments, data storage 804 can be implemented using two or more physical devices.

Data storage 804 can include computer-readable program instructions 806 and, in some cases, additional data. In some embodiments, data storage 804 can additionally include storage required to perform at least part of the herein-described scenarios, methods, and techniques and/or at least part of the functionality of the herein-described devices and networks.

In some embodiments, computing device 800 can include one or more sensors. The sensor(s) can be configured to measure conditions in an environment for computing device 800 and provide data about that environment. The data can include, but is not limited to, location data about computing device 800, velocity (velocity including speed and/or direction) data about computing device 800, acceleration data about computing device 800, and other data about the environment for computing device 800. The one or more sensors can include, but are not limited to, Global Positioning System (GPS) sensor(s), location sensors(s), gyroscope(s), accelerometer(s), magnetometer(s), camera(s), light sensor(s), infrared sensor(s), and microphone(s). Other examples of sensors are possible as well.

Cloud-Based Servers

Figure 8B:
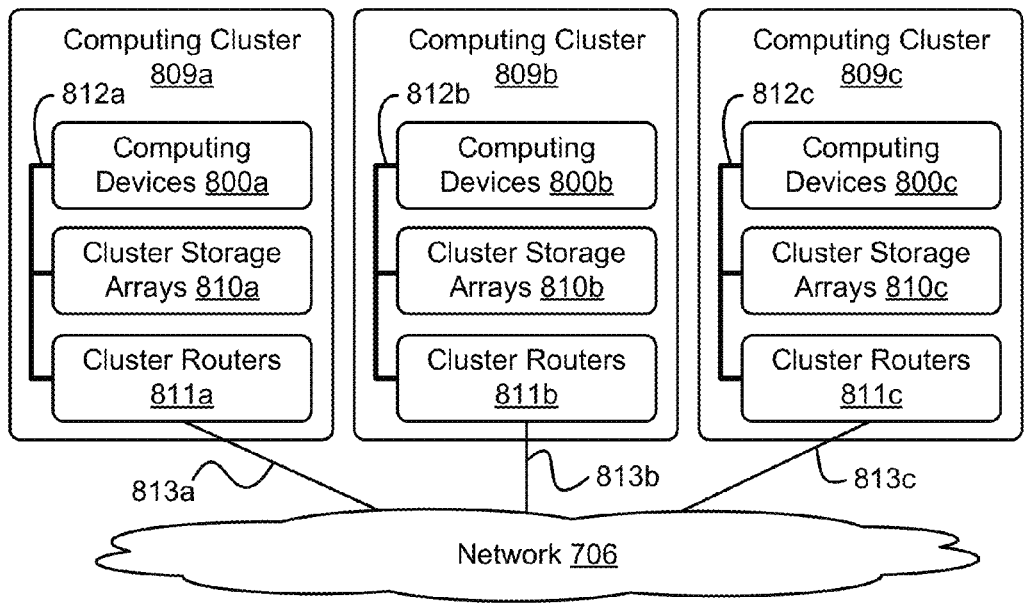
FIG. 8B depicts a cloud-based server system, in accordance with an example embodiment.

FIG. 8B depicts network 706 of computing clusters 809a, 809b, 809c arranged as a cloud-based server system in accordance with an example embodiment. Server devices 708 and/or 710 and/or computing clusters 809a, 809b, and/or 809c can represent one or more computing devices that can generate and/or utilize one or more memory, boot, and/or other images written using the herein-described techniques related to image generation; e.g., algorithm A1. In particular, server devices 708 and/or 710 and/or computing clusters 809a, 809b, and/or 809c can be configured to perform some or all of the herein-described functions related to at least algorithms A1 and A2, mobile device 102, memory 110, scenarios 100, 200, and 500, and method 1100.

Some or all of the modules/components of server devices 708 and/or 710 can be cloud-based devices that store program logic and/or data of cloud-based applications and/or services. In some embodiments, server devices 708 and/or 710 can be on a single computing device residing in a single computing center. In other embodiments, server devices 708 and/or 710 can include multiple computing devices in a single computing center, or even multiple computing devices located in multiple computing centers located in diverse geographic locations. For example, FIG. 7 depicts each of server devices 708 and 710 residing in different physical locations.

In some embodiments, software and data associated with server devices 708 and/or 710 can be encoded as computer readable information stored in non-transitory, tangible computer readable media (or computer readable storage media) and accessible by one or more of programmable devices 804a-804e and/or other computing devices. In some embodiments, data associated with server devices 708 and/or 710 can be stored on a single disk drive, flash drive, or other tangible storage media, or can be implemented on multiple disk drives, flash drives, or other tangible storage media located at one or more diverse geographic locations.

FIG. 8B depicts a cloud-based server system in accordance with an example embodiment. In FIG. 8B, the functions of server devices 708 and/or 710 can be distributed among three computing clusters 809a, 809b, and 809c. Computing cluster 809a can include one or more computing devices 800a, cluster storage arrays 810a, and cluster routers 811a connected by a local cluster network 812a. Similarly, computing cluster 809b can include one or more computing devices 800b, cluster storage arrays 810b, and cluster routers 811b connected by a local cluster network 812b. Likewise, computing cluster 809c can include one or more computing devices 800c, cluster storage arrays 810c, and cluster routers 811c connected by a local cluster network 812c.

In some embodiments, each of the computing clusters 809a, 809b, and 809c can have an equal number of computing devices, an equal number of cluster storage arrays, and an equal number of cluster routers. In other embodiments, however, each computing cluster can have different numbers of computing devices, different numbers of cluster storage arrays, and different numbers of cluster routers. The number of computing devices, cluster storage arrays, and cluster routers in each computing cluster can depend on the computing task or tasks assigned to each computing cluster.

In computing cluster 809a, for example, computing devices 800a can be configured to perform various computing tasks of server devices 708 and/or 710. In one embodiment, the various functionalities of server devices 708 and/or 710 can be distributed among one or more of computing devices 800a, 800b, and 800c. Computing devices 800b and 800c in computing clusters 809b and 809c can be configured similarly to computing devices 800a in computing cluster 809a. On the other hand, in some embodiments, computing devices 800a, 800b, and 800c can be configured to perform different functions.

In some embodiments, computing tasks and stored data associated with server devices 708 and/or 710 be distributed across computing devices 800a, 800b, and 800c based at least in part on the storage and/or processing requirements of some or all components/modules of server devices 708 and/or 710, the storage and/or processing capabilities of computing devices 800a, 800b, and 800c, the latency of the network links between the computing devices in each computing cluster and between the computing clusters themselves, and/or other factors that can contribute to the cost, speed, fault-tolerance, resiliency, efficiency, and/or other design goals of the overall system architecture.

The cluster storage arrays 810a, 810b, and 810c of the computing clusters 809a, 809b, and 809c can be data storage arrays that include disk array controllers configured to manage read and write access to groups of hard disk drives. The disk array controllers, alone or in conjunction with their respective computing devices, can also be configured to manage backup or redundant copies of the data stored in the cluster storage arrays to protect against disk drive or other cluster storage array failures and/or network failures that prevent one or more computing devices from accessing one or more cluster storage arrays.

Similar to the manner in which the functions of server devices 708 and/or 710 can be distributed across computing devices 800a, 800b, and 800c of computing clusters 809a, 809b, and 809c, various active portions and/or backup portions of data for these components can be distributed across cluster storage arrays 810a, 810b, and 810c. For example, some cluster storage arrays can be configured to store the data of one or more modules/components of server devices 708 and/or 710, while other cluster storage arrays can store data of other modules/components of server devices 708 and/or 710. Additionally, some cluster storage arrays can be configured to store backup versions of data stored in other cluster storage arrays.

The cluster routers 811a, 811b, and 811c in computing clusters 809a, 809b, and 809c can include networking equipment configured to provide internal and external communications for the computing clusters. For example, the cluster routers 811a in computing cluster 809a can include one or more internet switching and routing devices configured to provide (i) local area network communications between the computing devices 800a and the cluster storage arrays 801a via the local cluster network 812a, and (ii) wide area network communications between the computing cluster 809a and the computing clusters 809b and 809c via the wide area network connection 813a to network 706. Cluster routers 811b and 811c can include network equipment similar to the cluster routers 811a, and cluster routers 811b and 811c can perform similar networking functions for computing clusters 809b and 809b that cluster routers 811a perform for computing cluster 809a.

In some embodiments, the configuration of the cluster routers 811a, 811b, and 811c can be based at least in part on the data communication requirements of the computing devices and cluster storage arrays, the data communications capabilities of the network equipment in the cluster routers 811a, 811b, and 811c, the latency and throughput of local networks 812a, 812b, 812c, the latency, throughput, and cost of wide area network links 813a, 813b, and 813c, and/or other factors that can contribute to the cost, speed, fault-tolerance, resiliency, efficiency and/or other design goals of the moderation system architecture.

Example Methods of Operation

Figure 9:
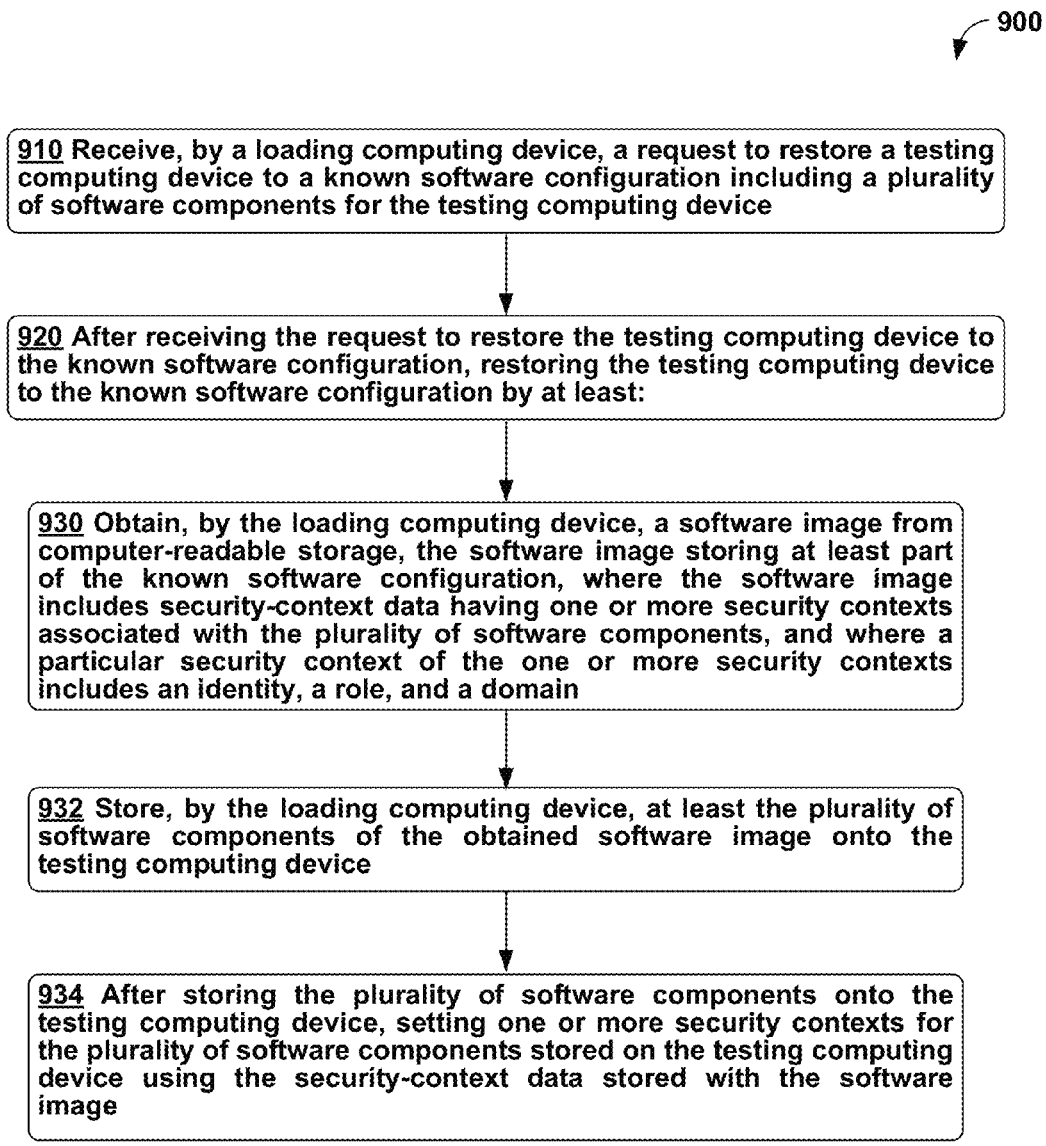
FIG. 9 is a flow chart of yet another method, in accordance with an example embodiment.

FIG. 9 is a flowchart illustrating method 900, in accordance with an embodiment. Method 900 can be carried out by a loading computing device, such as, but not limited to, one or more computing devices 800 such as discussed above in the context of FIG. 8A. For example, data storage 804 of computing device 800 can store computer readable instructions 806 that, when executed by one or more processors 803 of computing device 800, can cause computing device 800 to perform at least the herein-described features of method 900.

Method 900 can begin at block 910, where the loading computing device can receive a request to restore a testing computing device to a known software configuration including a plurality of software components for the testing computing device, such as discussed above at least in the context of block 310 of method 302 of FIG. 3A, method 380 of FIG. 3B, and the script of Table 1.

At block 920, after receiving the request to restore the testing computing device to the known software configuration, the loading computing device can restore the testing computing device to the known software configuration by at least carrying out the procedures of blocks 930, 932, and 934, such as discussed above at least in the context of block 310 of method 302 of FIG. 3A, method 380 of FIG. 3B, and the script of Table 1.

At block 930, the loading computing device can obtain a software image from computer-readable storage, such as discussed above in the context of at least blocks 350, 360, 362, 364 of method 302 of FIG. 3A, method 380 of FIG. 3B, and the script of Table 1. The software image can store at least part of the known software configuration and the software image can include security-context data having one or more security contexts associated with the plurality of software components, where a particular security context of the one or more security contexts comprises an identity, a role, and a domain, such as discussed above at least in the context of block 260 of method 200, blocks 360-364 of method 302 of FIG. 3A, method 380 of FIG. 3B, and the script of Table 1. For example, the script of Table 1 includes a "make_sc_script" function to make a security-context script that contains commands. When the security-context script is executed, the commands can set security contexts for one or more files and/or other software components of a software image. This security-context script can be and/or contain the security-context data.

At block 932, the loading computing device can store at least the plurality of software components of the obtained software image onto the testing computing device, such as discussed above at least in the context of blocks 352 and 362 of method 302 of FIG. 3A, method 380 of FIG. 3B, and the script of Table 1. For example, the script of Table 1 includes a "restore" function to store saved information about a plurality of software components of the obtained software image onto a testing computing device.

At block 934, the loading computing device can, after storing the plurality of software components onto the testing computing device, set one or more security contexts for the plurality of software components stored on the testing computing device using the security-context data stored with the software image, such as discussed above at least in the context of block 364 of method 302 of FIG. 3A, method 380 of FIG. 3B, and the script of Table 1. For example, the script of Table 1 includes a "restore_filesystem" function that executes the security-context script discussed above in the context of block 930, where the security-context script can set one or more security contexts for the plurality of software components stored on the testing computing device.

In some embodiments, method 900 can further include: storing, by the loading computing device, an image of an updated software configuration of the testing computing device as the software image storing the known software configuration, where the updated software configuration includes a software configuration of the testing computing device updated based on one or more selections of one or more settings for the software configuration, such as discussed above at least in the context of blocks 286 and 288 of method 280 depicted in FIG. 2B.

In other embodiments, the testing computing device can include testing computer-readable storage divisible into a plurality of partitions. Then, storing the image of the updated software configuration of the testing computing device as the software image can include: determining, by the loading computing device, one or more first partitions of the plurality of partitions to be stored using a first storage technique; storing, by the loading computing device, the one or more first partitions as part of the software image using the first storage technique; determining, by the loading computing device, one or more second partitions of the plurality of partitions to be stored using a second storage technique; and storing the one or more storage partitions as part of the software image using the second storage technique, such as discussed above at least in the context of blocks 250 and 260 of method 202 of FIG. 3A and the script of Table 1. For example, the script of Table 1 includes a "snapshot" function to store saved information about a plurality of software components of a testing computing device as one or more snapshots, where the snapshots are obtained using two example storage techniques indicated by the "snapshot_filesystem" and "snapshot_byte4byte" functions called by the "snapshot" function of the Table 1 script. In particular embodiments, the first storage technique comprises a byte-for-byte storage technique, and the second storage technique comprises a file-by-file copying storage technique, such as discussed above in the context of at least the respective "snapshot_byte4byte" and "snapshot filesystem" functions of the script of Table 1.

In other particular embodiments, a particular second partition of the one or more second partitions includes a plurality of files that includes a particular file, and where storing the security-context data of the software image for one or more security contexts associated with one or more components of the software image includes: determining a particular security context for the particular file; and storing data for the particular security context for the particular file as at least part of security-context data stored with the software image, such as discussed above at least in the context of blocks 260, 262, 264 of method 202 of FIG. 3A and the script of Table 1. For example, the script of Table 1 includes a "make_sc_script" function to determine and save security context data into a security-context script. In even other particular embodiments, setting the one or more security contexts of the one or more components of the software image based on the stored security-context data of the software image can include: determining the particular security context for the particular file from the security-context data stored with the software image, and setting, by the loading computing device, a security context of the particular file to be the particular security context. For example, the "restore" function of the script of Table 1 can execute the above-mentioned security-context script to set the security context of a particular file.

In still other embodiments, method 900 can include: attempting to conduct a testing session that includes the testing computing device, such as discussed above at least in the context of computing devices 100, 200, methods 102, 202, 280, user interface 420, scenario 400, and FIGS. 1, 2A, 2B, and 4. In particular embodiments, attempting to conduct the testing session can include: determining, by the loading computing device, one or more software entities to be tested during the testing session; determining, by the loading computing device, whether the one or more software entities are suspicious software entities; and after determining that the one or more software entities are suspicious software entities, the loading computing device determining to refrain from conducting the testing session, such as discussed above at least in the context of blocks 140 and 150 of method 102 and computing device 100 depicted in FIG. 1.

In even other embodiments, method 900 can include: conducting a testing session that includes the testing computing device; after conducting the testing session, determining, by the loading computing device, whether to restore the testing computing device to the known software configuration; and after determining to restore the testing computing device to the known software configuration, the loading computing device: removing one or more software applications from the testing computing device that were stored thereon during the testing session; removing one or more application data files from the testing computing device that were stored thereon during the testing session; and removing one or more debugging log files from the testing computing device that were stored thereon during the testing session, such as discussed above at least in the context of blocks 382, 384, 386, and 388 of method 102 depicted in FIG. 3B and computing device 300a and user interface 620 of scenario 400 depicted in FIG. 6.

In yet other embodiments, method 900 can include: conducting a testing session that includes the testing computing device; after conducting the testing session, determining, by the loading computing device, whether to restore the testing computing device to the known software configuration; and after determining to restore the testing computing device to the known software configuration, clearing, by the loading computing device, a kernel message buffer of the testing computing device, such as discussed above at least in the context of blocks 382, 390 of method 102 depicted in FIG. 3B and computing device 300a and user interface 620 of scenario 400 depicted in FIG. 6.

The above detailed description describes various features and functions of the disclosed systems, devices, and methods with reference to the accompanying figures. In the figures, similar symbols typically identify similar components, unless context dictates otherwise. The illustrative embodiments described in the detailed description, figures, and claims are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the ladder diagrams, scenarios, and flowcharts in the figures and as discussed herein, each block and/or communication may represent a processing of information and/or a transmission of information in accordance with example embodiments. Alternative embodiments are included within the scope of these example embodiments. In these alternative embodiments, for example, functions described as blocks, transmissions, communications, requests, responses, and/or messages may be executed out of order from that shown or discussed, including substantially concurrent or in reverse order, depending on the functionality involved. Further, more or fewer blocks and/or functions may be used with any of the ladder diagrams, scenarios, and flowcharts discussed herein, and these ladder diagrams, scenarios, and flowcharts may be combined with one another, in part or in whole.

A block that represents a processing of information may correspond to circuitry that can be configured to perform the specific logical functions of a herein-described method or technique. Alternatively or additionally, a block that represents a processing of information may correspond to a module, a segment, or a portion of program code, and may include related or other data. The program code may include one or more instructions executable by a processor for implementing specific logical functions or actions in the method or technique. The program code and/or related data may be stored on any type of computer readable medium such as a storage device including a disk or hard drive or other storage medium.

The computer readable medium may also include non-transitory computer readable media such as non-transitory computer-readable media that stores data for short periods of time like register memory, processor cache, and random access memory (RAM). The computer readable media may also include non-transitory computer readable media that stores program code and/or data for longer periods of time, such as secondary or persistent long term storage, like read only memory (ROM), optical or magnetic disks, compact-disc read only memory (CD-ROM), for example. The computer readable media may also be any other volatile or nonvolatile storage systems. A computer readable medium may be considered a computer readable storage medium, for example, or a tangible storage device.

Moreover, a block that represents one or more information transmissions may correspond to information transmissions between software and/or hardware modules in the same physical device. However, other information transmissions may be between software modules and/or hardware modules in different physical devices.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

The invention claimed is:

1. A method, comprising:
receiving, by a loading computing device, a request to restore a testing computing device to a known software configuration comprising a plurality of software components for the testing computing device, wherein the testing computing device comprises testing computer-readable storage divisible into a plurality of partitions; and
after receiving the request to restore the testing computing device to the known software configuration, restoring the testing computing device to the known software configuration by at least:
obtaining, by the loading computing device, a software image from computer-readable storage, the software image storing at least part of the known software configuration, wherein the software image comprises security-context data having one or more security contexts associated with the plurality of software components, and wherein a particular security context of the one or more security contexts comprises an identity, a role, and a domain,
storing, by the loading computing device, at least the plurality of software components of the obtained software image onto the testing computing device by at least:
determining, by the loading computing device, one or more first partitions of the plurality of partitions to be stored using a first storage technique that comprises a byte-for-byte storage technique;

storing, by the loading computing device, the one or more first partitions as part of the software image using the first storage technique;

determining, by the loading computing device, one or more second partitions of the plurality of partitions to be stored using a second storage technique that comprises a file-by-file storage technique; and storing the one or more storage partitions as part of the software image using the second storage technique, and after storing the plurality of software components onto the testing computing device, setting one or more security contexts for the plurality of software components stored on the testing computing device using the security-context data stored with the software image.

2. The method of claim 1, further comprising:
storing, by the loading computing device, an image of an updated software configuration of the testing computing device as the software image storing the known software configuration, wherein the updated software configuration comprises a software configuration of the testing computing device updated based on one or more selections of one or more settings for the software configuration.

3. The method of claim 1, further comprising:
disabling at least wireless communications with the testing computing device.

4. The method of claim 1, further comprising:
after receiving the request to restore the testing computing device to the known software configuration, removing one or more applications installed on the testing computing device.

5. The method of claim 1, wherein a particular second partition of the one or more second partitions comprises a plurality of files that includes a particular file, and wherein storing the security-context data of the software image for one or more security contexts associated with one or more components of the software image comprises:
determining a particular security context for the particular file; and
storing data for the particular security context for the particular file as at least part of security-context data stored with the software image.

6. The method of claim 5, wherein setting the one or more security contexts of the one or more components of the software image based on the stored security-context data of the software image:
determining the particular security context for the particular file from the security-context data stored with the software image; and
setting, by the loading computing device, a security context of the particular file to be the particular security context.

7. The method of claim 1, further comprising:
attempting to conduct a testing session that includes the testing computing device.

8. The method of claim 7, wherein attempting to conduct the testing session comprises:
determining, by the loading computing device, one or more software entities to be tested during the testing session;
determining, by the loading computing device, whether the one or more software entities are suspicious software entities; and after determining that the one or more software entities are suspicious software entities, the loading computing device determining to refrain from conducting the testing session.

9. The method of claim 1, further comprising:
conducting a testing session that includes the testing computing device;
after conducting the testing session, determining, by the loading computing device, whether to restore the testing computing device to the known software configuration; and
after determining to restore the testing computing device to the known software configuration, the loading computing device:
removing one or more software applications from the testing computing device that were stored thereon during the testing session;
removing one or more application data files from the testing computing device that were stored thereon during the testing session; and
removing one or more debugging log files from the testing computing device that were stored thereon during the testing session.

10. The method of claim 1, further comprising:
conducting a testing session that includes the testing computing device;
after conducting the testing session, determining, by the loading computing device, whether to restore the testing computing device to the known software configuration; and
after determining to restore the testing computing device to the known software configuration, clearing, by the loading computing device, a kernel message buffer of the testing computing device.

11. A computing device, comprising:
one or more processors; and
data storage configured to store at least a software image and executable instructions, wherein the executable instructions, when executed by the one or more processors, cause the computing device to perform functions comprising:
receiving a request to restore a testing computing device to a known software configuration comprising a plurality of software components for the testing computing device, wherein the testing computing device comprises testing computer-readable storage divisible into a plurality of partitions; and
after receiving the request to restore the testing computing device to the known software configuration, restoring the testing computing device to the known software configuration by at least:
obtaining the software image from the computer-readable storage, the software image storing the known software configuration, wherein the software image comprises security-context data having one or more security contexts associated with the plurality of software components, and wherein a particular security context of the one or more security contexts comprises an identity, a role, and a domain,
storing at least the plurality of software components of the obtained software image onto the testing computing device by at least:
determining, by the loading computing device, one or more first partitions of the plurality of partitions to be stored using a first storage technique that comprises a byte-for-byte storage technique;

storing, by the loading computing device, the one or more first partitions as part of the software image using the first storage technique;

determining, by the loading computing device, one or more second partitions of the plurality of partitions to be stored using a second storage technique that comprises a file-by-file storage technique; and storing the one or more storage partitions as part of the software image using the second storage technique, and after storing the plurality of software components onto the testing computing device, setting one or more security contexts for the plurality of software components stored on the testing computing device using the security-context data stored with the software image.

12. The computing device of claim 11, wherein the functions further comprise:

storing an image of an updated software configuration of the testing computing device as the software image storing the known software configuration, wherein the updated software configuration comprises a software configuration of the testing computing device updated based on one or more selections of one or more settings for the software configuration.

13. The computing device of claim 11, further comprising:

disabling at least wireless communications with the testing computing device.

14. The computing device of claim 11, wherein a particular second partition of the one or more second partitions comprises a plurality of files that includes a particular file, and wherein storing the security-context data of the software image for one or more security contexts associated with one or more components of the software image comprises:

determining a particular security context for the particular file; and storing data for the particular security context for the particular file as at least part of security-context data stored with the software image.

15. The computing device of claim 14, wherein setting the one or more security contexts of the one or more components of the software image based on the stored security-context data of the software image:

determining the particular security context for the particular file from the security-context data stored with the software image; and setting a security context of the particular file to be the particular security context.

16. The computing device of claim 11, wherein the functions further comprise:

attempting to conduct a testing session that includes the testing computing device by at least:

determining one or more software entities to be tested during the testing session;

determining whether the one or more software entities are suspicious software entities; and after determining that the one or more software entities are suspicious software entities, determining to refrain from conducting the testing session.

17. The computing device of claim 11, wherein the functions further comprise:

conducting a testing session that includes the testing computing device;

after conducting the testing session, determining whether to restore the testing computing device to the known software configuration; and after determining to restore the testing computing device to the known software configuration:

removing one or more software applications from the testing computing device that were stored thereon during the testing session;

removing one or more application data files from the testing computing device that were stored thereon during the testing session; and removing one or more debugging log files from the testing computing device that were stored thereon during the testing session.

18. The computing device of claim 11, wherein the functions further comprise:

conducting a testing session that includes the testing computing device;

after conducting the testing session, determining whether to restore the testing computing device to the known software configuration; and after determining to restore the testing computing device to the known software configuration, clearing a kernel message buffer of the testing computing device.

19. An article of manufacture including a tangible computer-readable storage medium having instructions stored thereon that, in response to execution by one or more processors of a computing device, cause the computing device to perform functions comprising:

receiving a request to restore a testing computing device to a known software configuration comprising a plurality of software components for the testing computing device wherein the testing computing device comprises testing computer-readable storage divisible into a plurality of partitions; and after receiving the request to restore the testing computing device to the known software configuration, restoring the testing computing device to the known software configuration by at least:

obtaining the software image from the computer-readable storage, the software image storing the known software configuration, wherein the software image comprises security-context data having one or more security contexts associated with the plurality of software components, and wherein a particular security context of the one or more security contexts comprises an identity, a role, and a domain, storing at least the plurality of software components of the obtained software image onto the testing computing device by at least:

determining, by the loading computing device, one or more first partitions of the plurality of partitions to be stored using a first storage technique that comprises a byte-for-byte storage technique;

storing, by the loading computing device, the one or more first partitions as part of the software image using the first storage technique;

determining, by the loading computing device, one or more second partitions of the plurality of partitions to be stored using a second storage technique that comprises a file-by-file storage technique; and storing the one or more storage partitions as part of the software image using the second storage technique, and after storing the plurality of software components onto the testing computing device, setting one or more security contexts for the plurality of software components stored on the testing computing device using the security-context data stored with the software image.

20. The article of manufacture of claim 19, wherein the functions further comprise:

storing an image of an updated software configuration of the testing computing device as the software image storing the known software configuration, wherein the updated software configuration comprises a software configuration of the testing computing device updated based on one or more selections of one or more settings for the software configuration.

* * * * *